United States Patent
Donlan et al.

(10) Patent No.: US 10,417,190 B1
(45) Date of Patent: Sep. 17, 2019

(54) LOG-STRUCTURED FILE SYSTEM FOR ZONE BLOCK DEVICES WITH SMALL ZONES

(71) Applicant: Amazon Technologies, Inc., Reno, NV (US)

(72) Inventors: Bryan James Donlan, Seattle, WA (US); Claire Elizabeth Suver, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 984 days.

(21) Appl. No.: 14/496,377

(22) Filed: Sep. 25, 2014

(51) Int. Cl.
| | |
|---|---|
| *G06F 16/00* | (2019.01) |
| *G06F 16/178* | (2019.01) |
| *G06F 11/14* | (2006.01) |
| *G06F 16/11* | (2019.01) |
| *G06F 16/10* | (2019.01) |
| *G06F 16/23* | (2019.01) |
| *G06F 3/06* | (2006.01) |

(52) U.S. Cl.
CPC .......... *G06F 16/178* (2019.01); *G06F 3/0643* (2013.01); *G06F 11/1435* (2013.01); *G06F 11/1451* (2013.01); *G06F 16/10* (2019.01); *G06F 16/128* (2019.01); *G06F 16/2358* (2019.01); *G06F 16/2365* (2019.01)

(58) Field of Classification Search
CPC ............. G06F 11/1458; G06F 11/2056; G06F 11/2011; G06F 11/2082; G06F 11/2028; G06F 11/203; G06F 11/2041; G06F 11/2046; G06F 11/2097; G06F 11/0246; G06F 17/30091; G06F 17/30011; G06F 17/30067; G06F 17/30088; G06F 17/30194; G06F 17/30342; G06F 17/30345; G06F 17/30368; G06F 16/13; G06F 16/164; G06F 16/10; G06F 16/2358; G06F 16/128; G06F 16/2365; G06F 16/1734; G06F 11/1435; G06F 3/0643

See application file for complete search history.

(56) References Cited

U.S. PATENT DOCUMENTS

| | | | | |
|---|---|---|---|---|
| 5,675,727 A | * | 10/1997 | Watanabe | ......... G06F 17/30368 |
| | | | | 714/18 |
| 6,938,056 B2 | * | 8/2005 | Burns | ................ G06F 11/1448 |

(Continued)

OTHER PUBLICATIONS

Rosenblum et al., "The Design and Implementation of a Log-Structured File System", ACM Transactions on Computer Systems, vol. 10, No. 1, Feb. 1992, pp. 26-52.

(Continued)

*Primary Examiner* — Srirama Channavajjala
(74) *Attorney, Agent, or Firm* — Davis Wright Tremaine LLP

(57) ABSTRACT

A system and method for obtaining a request to perform a data operation with a volume, wherein the volume is a logical storage space in which data objects may be stored, determining a plurality of zones for performing the data operation with the volume, wherein each zone of the plurality of zones comprises a series of sectors of a computer-readable storage medium that forms an append-only section of the computer-readable storage medium, and performing the data operation with the volume on the plurality of zones.

20 Claims, 12 Drawing Sheets

(56) References Cited

U.S. PATENT DOCUMENTS

| | | | |
|---|---|---|---|
| 7,512,979 B1* | 3/2009 | Koike | G06F 21/6209 |
| | | | 707/999.202 |
| 2004/0093605 A1* | 5/2004 | Alverson | G06F 9/52 |
| | | | 719/310 |
| 2008/0071842 A1* | 3/2008 | Tokuda | G06F 11/1469 |
| 2012/0130949 A1* | 5/2012 | Picken | G06F 17/30115 |
| | | | 707/626 |
| 2013/0297855 A1* | 11/2013 | Gupta | G06F 3/0656 |
| | | | 711/103 |

OTHER PUBLICATIONS

AWS/Glacier/Volumes/SequentialFS/PixieFS—Amazon Wiki, pp. 1-8, Revision Jun. 2014 by Bdonlan.

* cited by examiner

LOG-STRUCTURED FILE SYSTEM FOR ZONE BLOCK DEVICES WITH SMALL ZONES

BACKGROUND

Storage demands for data storage systems tend to increase over time, as more and more information is converted to digital form. As the demands for storage space increase, storage density becomes increasingly important. Shingled magnetic recording techniques have been developed as one way to increase storage density at a device level, but devices using shingled magnetic recording techniques have certain operational characteristics that may be taken into account when they are deployed in data storage systems; for example, it may be impractical to write data to shingled magnetic recording devices in a non-sequential fashion, similarly to many tape-based storage devices. On such devices, deletions and data migration often create gaps of unused yet unusable regions on a sequential file system, resulting in a waste of valuable storage space.

BRIEF DESCRIPTION OF THE DRAWINGS

Various embodiments in accordance with the present disclosure will be described with reference to the drawings, in which.

DETAILED DESCRIPTION

Figure 1:
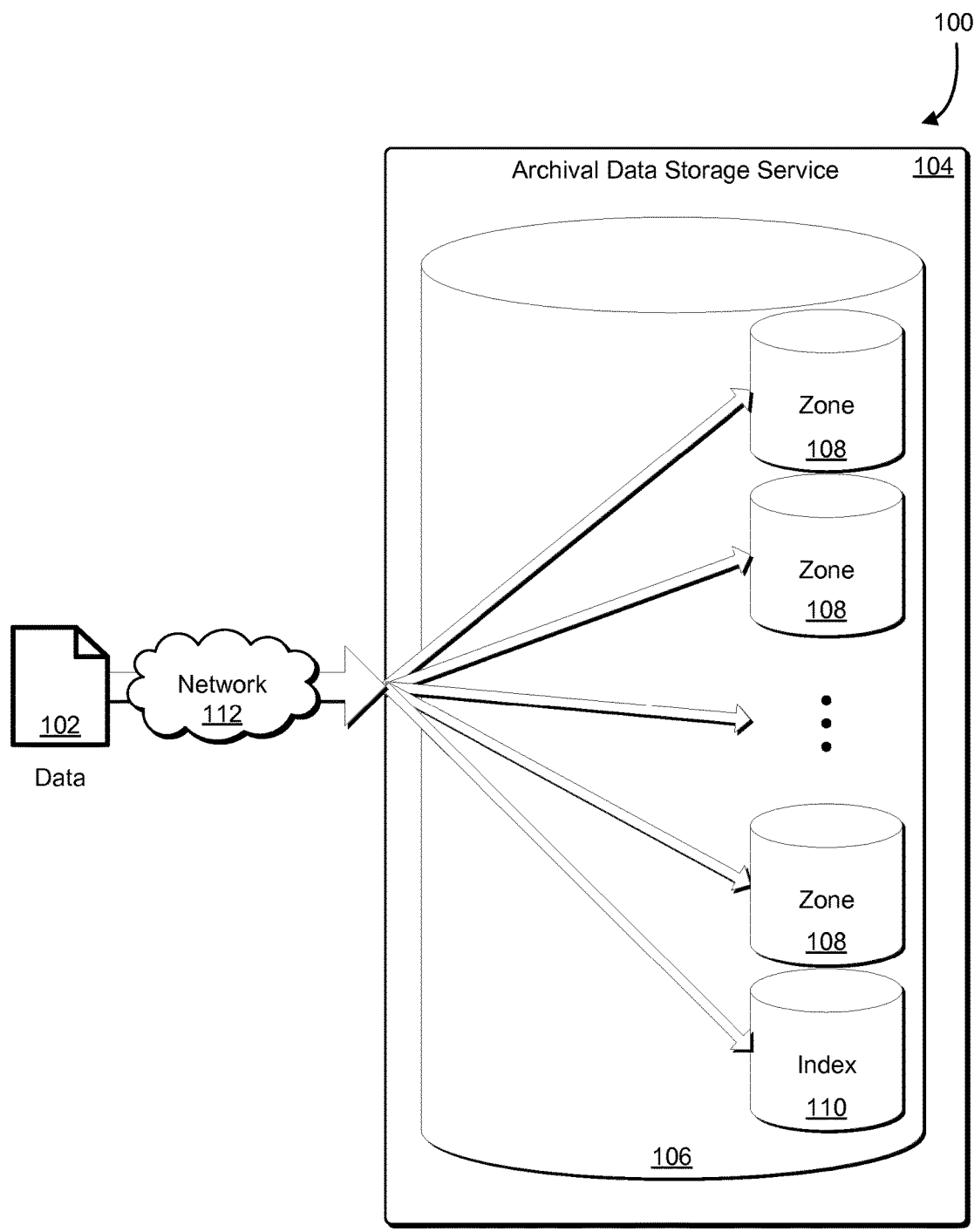
FIG. 1 illustrates an example of a multi-active zone file system in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include methods and systems for a log-structured file system having multiple active logs (multi-active zone file system). The described and suggested techniques improve the field of computing, and specifically the field of archival data storage, by providing a new and useful file system for storage of data on sequential-write/append-only media. Additionally, the described and suggested techniques improve the functioning of computer systems by efficiently utilizing available hard drive space by storing append-only data more compactly, thereby minimizing wasted space, in one or more zones on a hard disk. Moreover, the described and suggested techniques offer meaningful advantages over general log-structured file systems by supporting execution of PUT and DELETE requests at any time and by allowing data to be written sequentially to multiple active zones.

Certain types of disk operations by the multi-active zone file system may cause a reduced need for zone cleaning, which may result in less wear to disks. The multi-active zone file system may also reduce disk wear by minimizing copying of live data. Furthermore, less disk space may be wasted due to space reserved for zone cleaning and zone buffers. Additionally, zone cleaning with a multi-active zone file system may be performed incrementally, thereby avoiding complex checkpointing of the zone cleaning process to minimize waste due to potential process termination, disk power downs, or crashes.

The multi-active zone file system may partition a storage medium, such as one or more disk drives, into a set of zones of a certain size. Each zone of the set of zones may act like a separate log of a log-structured file system; that is, each zone may have a head ("log head") that moves/advances as data is written to the zone sequentially from the log head. In some examples, "log-structured file system" may refer to a data storage management system wherein data is written to a sequential (i.e., append-only) buffer, called a "log," of a persistent storage medium (e.g., a hard disk or flash memory). The log may contain indexing information so that data may be read back from the log efficiently. In some implementations, the log may be circular, while in other implementations the log may be divided into segments. The multi-active zone file system of the present disclosure may store data objects for volumes in one or more zones. Volumes may be redundancy encoded into smaller volumes, referred to as volumelets, and the data to be stored may themselves be split into shards written to the zones as data objects. In some examples, "redundancy encoding" may include splitting data into multiple portions of data, in which one or more of the portions contain redundant data such that should at least one portion of data be unavailable, that portion of data may be determined with reference to the redundant data. Examples of redundancy encoding include erasure-coding, forward error correcting, and generating parity data.

The data for the volumelets in turn may be written to one or more of the zones in sequential fashion, starting at the log head of the zone. Index pages for finding the data written to the zones, periodically written checkpoints tracking the write pointers of the zones, and other metadata may be maintained in separate zones from the data zones. Sync pointers may additionally be written to zones to provide partial ordering of data and metadata operations. That is, during a replay, which may be performed after a crash, power outage, or forced restart, the multi-active zone file system state may be restored to the state it was at the time a most-recent checkpoint was generated. Thereafter, the sync pointers may be used to replay log heads from the point of the most-recent checkpoint to the state the multi-active zone file system was at the point before the event triggering the replay process.

To optimize performance and maximize space, zones may be cleaned periodically or on command. Zone cleaning heuristics may attempt to determine which zones are candidates for data relocation, which may be based on which zones have the greatest proportions of deleted space. Relocating live data from a mostly-empty zone to another zone may allow the mostly-empty zone to be flagged as empty and available for writing. Zone cleaning may be efficiently performed with reference to zone footers, which may provide the ability to determine quickly that a zone is closed and a summary of the data stored on the zone. Periodically, or as needed, to clean up and recover any corrupt or dangly data, a fixity check called a scrub may be performed. In some examples, "fixity check" may refer to a process of verifying that data objects are properly indexed and accounted for, and have not been altered or corrupted. The scrub may initially mark all records as not found in the index pages and, reading through the zones, mark records found as they are found and validated. At the conclusion of the scrub, any records that were not found or were determined to be corrupt or incomplete may be recovered or may be considered deleted.

FIG. 1 illustrates an aspect of an environment 100 in which an embodiment may be practiced. As illustrated in FIG. 1, the environment 100 may include a data 102 being stored with an archival storage service 104 having at least one hard drive 106 partitioned into a plurality of zones 108 for storing the data 102 in a volumelet spanning the zones 108. The multi-active zone file system may minimize wear by avoiding data movement as much as possible while still allowing for a shingled magnetic recording disk system and reducing the cost of random writes. The workload may operate without strict restrictions; i.e., data operations such as write requests (PUTs), read requests (GETs), and delete requests (DELETEs) may be accepted and performed (or caused to be performed, such as by a computer system sending data or a command across a network to a network-accessible storage device) at any time, with the type of workload having varying effects on garbage cleanup and disk wear. Because standard garbage collecting avoids touching data that does not need to be moved, a separate scrubbing process, also referred to as a fixity check, may run periodically (e.g., every three or four months) to verify that the file system structure is sound. Specifically, the scrubbing process may verify checksums on data records, check for dangling pointers to index segments, check for dangling pointers from index segments to data records, and search for orphaned data records and inconsistent live data. PUTs may be requests to write data synchronously or asynchronously in a data staging area of an archival data storage system to one or more zones of the multi-active zone file system.

The multi-active zone file system may minimize the cost of zone cleaning events by providing a ranked list of suggested volumelet candidates for migration. In this manner, zone cleaning costs may be kept low by selecting the highest-ranked volumelets for migration. In some examples, "migration" may refer to moving data associated with a volume or volumelet from one or more zones to a different host or hard disk.

The multi-active zone file system may be a log-structured file system, which may operate most effectively with append-only storage operations. Log-structured file systems often attempt to maximize write throughput over read throughput, which may be ideal for use in an archival data storage service that stores large amounts of data and read requests are infrequent. Shingled magnetic recording drives may be divided into many zones, which allow reasonable free space management and may enable high disk space management to minimize costs.

The disk format of the multi-active zone file system may comprise a data plane and a metadata plane. The data plane may be responsible for the storage of data objects and data-manipulating events, such as DELETEs. The metadata plane may be responsible for recording index data, volume-level and volume component-level metadata, summary information for the zone cleaning, and metadata needed for cold starts. The metadata plane may also periodically generate a checkpoint, thereby recording the in-memory of the file system to disk to improve recovery speed.

Many multi-active zone file system components may use a pseudo-actor concurrency model; that is, write requests may be serialized and passed through a chain of record processing components, and reads may bypass the serialization and make request-response calls to specific components. If a failure occurs, the file system instance may terminate, restart, go through a cold start, and replay process.

In some examples, a "zone" may be a series of sectors of a hard drive, such as a shingled magnetic recording disk, that form an append-only section of the disk. Zones may be individually append-only, but may be written to independently and may be resettable through a write-pointer reset. Data may be written to a zone as a series of records (e.g., data objects) with a fixed maximum size (e.g., 1 megabyte); however, in some cases checkpoints and index records may have a different fixed maximum size or may have no fixed maximum size.

The multi-active zone file system may take advantage of multiple sequential zones present on shingled magnetic recording drives. These zones individually may be append-only but may be written to independently. A given zone may accept writes at a write pointer, which can be re-set to clear the zone entirely. These shingled magnetic recording zones contain user data records, volume mutation events (e.g., volumelet creation or deletion events), sets of file system index pages, and other records.

Data represented by the data 102 may be any type of digital data, including one or more text files, bitmaps, video files, executable instructions, software applications, database records, and audio files. In some cases the data may be redundancy encoded (e.g., erasure-coded) into a plurality of shards for storage on one or more of the zones 108. The data may be provided to the archival data storage service 104 through a network 112, whereby the network 122 may be a communication network, such as the Internet, an intranet or an Internet service provider (ISP) network. The archival data storage service 104 may be a service provided by a computing resource service provider, such as the archival data storage service described in conjunction with FIG. 2.

The hard drive 106 may be any type of computer-readable medium, including a shingled magnetic recording drive, a random access hard drive, flash memory, optical media, and a solid-state device drive. The zones 108 may be a series of append-only storage regions on the hard drive 106 having write pointers indicating last write positions in the zones. For example, the hard drive 106 may be a five terabyte shingled magnetic recording drive and the hard drive 106 may be sectioned into a series of one gigabyte zones 108 and one gigabyte index zones, represented by the index zone 110. The index zone 110 may be a metadata zone used for storing an index and index pages that record the locations of where the data 102 may be stored in the zones 108.

Figure 2:
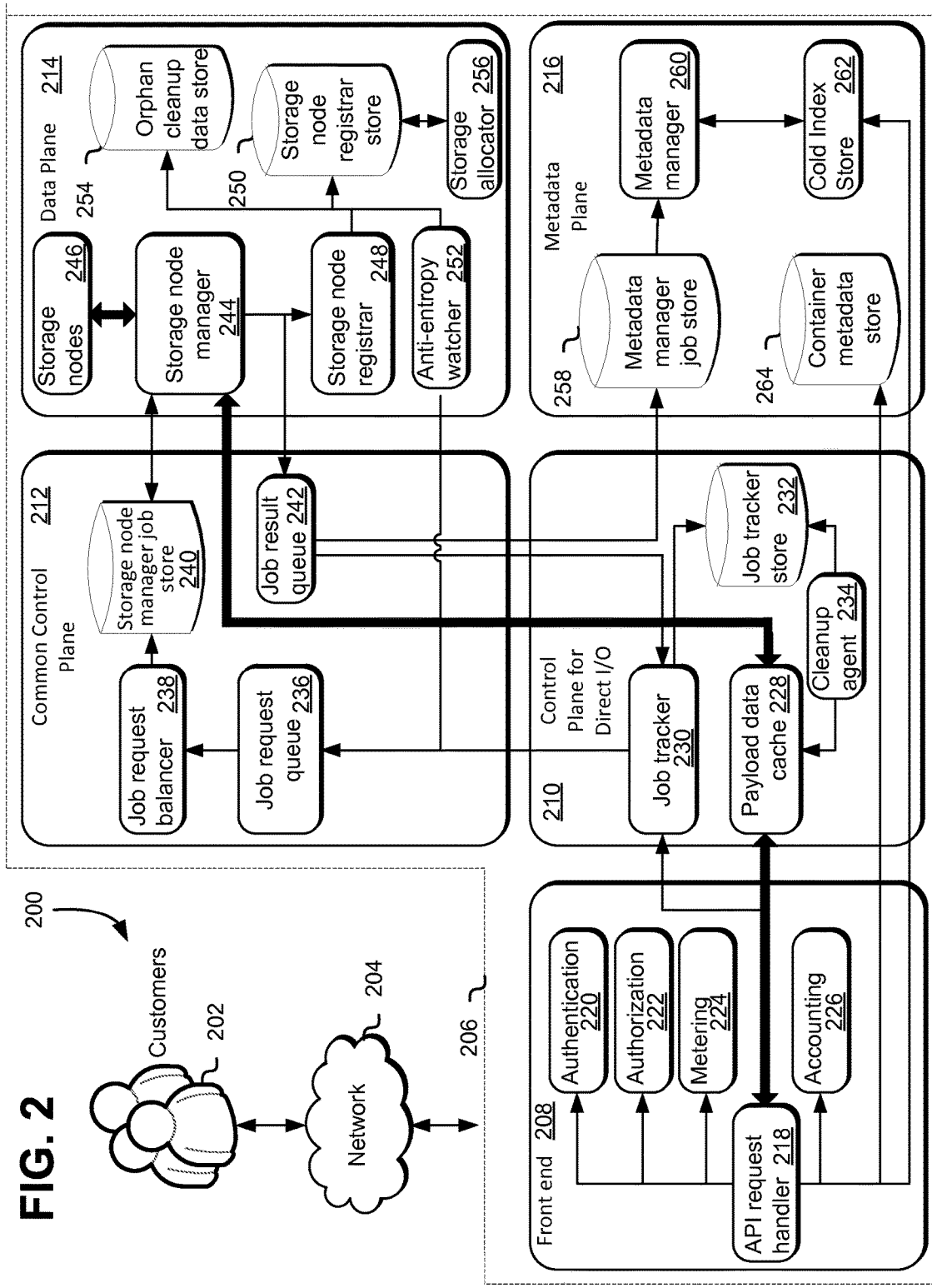
FIG. 2 illustrates an example environment in which archival data storage services may be implemented, in accordance with at least one embodiment.

FIG. 2 illustrates an example environment 200 in which an archival data storage system may be implemented, in accordance with an embodiment. One or more customers 202 connect, via a network 204, to an archival data storage system 206. In some examples, a "customer" may be the system(s) of a customer entity (such as an individual, company or other organization) that utilizes data storage services described. Such systems may include data centers, mainframes, individual computing devices, distributed computing environments and customer-accessible instances thereof or any other system capable of communicating with the archival data storage system. In some cases, a customer may be a machine instance (e.g., with direct hardware access) or virtual instance of a distributed computing system provided by a computing resource provider that also provides the archival data storage system. In some cases, the archival data storage system is integral to the distributed computing system and may include or be implemented by an instance, virtual or machine, of the distributed computing system. In various embodiments, network 204 may include the Internet, a local area network, a wide area network, a cellular data network and/or other data network.

The archival data storage system 206 may provide a multi-tenant or multi-customer environment where each tenant or customer may store, retrieve, delete or otherwise manage data in a data storage space allocated to the customer. In some cases, an archival data storage system 206 comprises multiple subsystems or "planes," each of which provides a particular set of services or functionalities. For example, as illustrated in FIG. 2, archival data storage system 206 includes front end 208, control plane for direct I/O 210, common control plane 212, data plane 214 and metadata plane 216. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows in FIG. 2. In particular, the main bulk data transfer paths in and out of archival data storage system 206 are denoted by bold arrows. It will be appreciated by those of ordinary skill in the art that various embodiments may have fewer or a greater number of systems, subsystems, and/or subcomponents than are illustrated in FIG. 2. Thus, the depiction of environment 200 in FIG. 2 should be taken as being illustrative in nature and not limited to the scope of the disclosure.

In the illustrative example, front end 208 implements a group of services that provides an interface between the archival data storage system 206 and external entities, such as one or more customers 202. The front end 208 may provide an application programming interface to enable a user to programmatically interface with the various features, components and capabilities of the archival data storage system. Such application programming interfaces may be part of a user interface that may include graphical user interfaces, Web-based interfaces, programmatic interfaces such as application programming interfaces and/or sets of remote procedure calls corresponding to interface elements, messaging interfaces in which the interface elements correspond to messages of a communication protocol, and/or suitable combinations thereof.

Capabilities provided by archival data storage system 206 may include data storage, data retrieval, data deletion, metadata operations, configuration of various operational parameters and the like. Metadata operations may include requests to retrieve catalogs of data stored for a particular customer, data recovery requests, job inquiries and the like. Configuration application programming interfaces may allow customers to configure account information, audit logs, policies, notifications settings, and the like. A customer may request the performance of any of the above operations by sending application programming interface requests to the archival data storage system. Similarly, the archival data storage system may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In some cases, archival data storage system 206 allows customers to create one or more logical structures such as logical data containers in which to store one or more archival data objects. In some examples, "data object" is used broadly and does not necessarily imply any particular structure or relationship to other data. A data object may be, for instance, simply a sequence of bits. Typically, such logical data structures may be created to meet certain business requirements of the customers and are independent of the physical organization of data stored in the archival data storage system. In some examples, the term "logical data container" may be a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration date, access control list, and the like. In various implementations, logical data containers may be created, deleted or otherwise modified by customers via application programming interface requests, by a system administrator or by the data storage system, for example, based on configurable information. For example, the following HTTP PUT request may be used, as an example, to create a logical data container with name "logical-container-name" associated with a customer identified by an account identifier "accountId".

PUT /{accountId}/logical-container-name HTTP/1.1

The archival data storage system 206 may provide the application programming interfaces for customers to store data objects into logical data containers. The following HTTP POST request may be used, in an illustrative example, to store a data object into a given logical container. The request may specify the logical path of the storage location, data length, reference to the data payload, a digital digest of the data payload and other information. In one case, the application programming interfaces may allow a customer to upload multiple data objects to one or more logical data containers in one request. In another case where the data object is large, the application programming interfaces may allow a customer to upload the data object in multiple parts, each with a portion of the data object.

POST /{accountId}/logical-container-name/data HTTP/1.1
Content-Length: 1128192
x-ABC-data-description: "annual-result-2012.xls"
x-ABC-md5-tree-hash: 634d9a0688aff95c In response to a data storage request, the archival data storage system 206 may provide a data object identifier if the data object is stored successfully. Such data object identifier may be used to retrieve, delete, or otherwise refer to the stored data object in subsequent requests. In some cases, such data object identifier may be "self-describing" in that it includes (for example, with or without encryption) storage location information that may be used by the archival data storage system to locate the data object without the need for additional data structures such as a global namespace key map. In addition, in some cases, data object identifiers may also encode other information such as payload digest, error-detection code, access control data and the other information that may be used to validate subsequent requests and data integrity. In some cases, the archival data storage system stores incoming data in a transient durable data store before moving it to archival data storage. Thus, although customers may perceive that data is persisted durably at the moment when an upload request is completed, actual storage to a long-term persisted data store may not commence until sometime later (e.g., 12 hours later). In some cases, the timing of the actual storage may depend on the size of the data object, the system load during a diurnal cycle, configurable information such as a service-level agreement between a customer and a storage service provider and other factors.

In some cases, archival data storage system 206 provides the application programming interfaces for customers to retrieve data stored in the archival data storage system. In such a case, a customer may initiate a job to perform the data retrieval and may learn the completion of the job by a notification or by polling the system for the status of the job. In some examples, a "job" may be a data-related activity corresponding to a customer request that may be performed temporally, independently from the time the request is received. For example, a job may include retrieving, storing, and deleting data, retrieving metadata and the like. A job may be identified by a job identifier that may be unique, for example, among all the jobs for a particular customer. The following HTTP POST request may be used, in an illustrative example, to initiate a job to retrieve a data object identified by a data object identifier "dataObjectId." In other implementations, a data retrieval request may request the retrieval of multiple data objects, data objects associated with a logical data container and the like.

POST /{accountId}/logical-data-container-name/data/{dataObjectId} HTTP/1.1

In response to the request, the archival data storage system 206 may provide a job identifier "job-id," that is assigned to the job in the following response. The response provides, in this example, a path to the storage location where the retrieved data will be stored.

HTTP/1.1 202 ACCEPTED
Location: /{accountId}/logical-data-container-name/jobs/{job-id}

At any given point in time, the archival data storage system may have many jobs pending for various data operations. In some cases, the archival data storage system may employ job planning, optimization techniques such as batch processing, load balancing, job coalescence and the like, to optimize system metrics such as cost, performance, scalability, and the like. In some cases, the timing of the actual data retrieval depends on factors such as the size of the retrieved data, the system load and capacity, active status of storage devices and the like. For example, in some cases, at least some data storage devices in an archival data storage system may be activated or inactivated according to a power management schedule, for example, to reduce operational costs. Thus, retrieval of data stored in a currently active storage device (such as a rotating hard drive) may be faster than retrieval of data stored in a currently inactive storage device (such as a spun-down hard drive).

When a data retrieval job is completed, the retrieved data may be stored in a staging data store and made available for customer download. In some cases, a customer is notified of the change in status of a job by a configurable notification service. In other cases, a customer may learn of the status of a job by polling the system using a job identifier. The following HTTP GET request may be used, as an example, to download data that is retrieved by a job identified by "job-id," using a download path that has been previously provided.

GET /{accountId}/logical-data-container-name/jobs/{job-id}/output HTTP/1.1

In response to the GET request, in an illustrative example, archival data storage system 206 may provide the retrieved data in the following HTTP response, with a tree-hash of the data for verification purposes.

HTTP/1.1 200 OK
Content-Length: 1128192
x-ABC-archive-description: "retrieved stuff"
x-ABC-md5-tree-hash: 693d9a7838aff95c
[1112192 bytes of user data follows]

A customer may request the deletion of a data object stored in an archival data storage system by specifying a data object identifier associated with the data object. For example, in an illustrative example, a data object with data object identifier "dataObjectId" may be deleted using the following HTTP request. In another example, a customer may request the deletion of multiple data objects such as those associated with a particular logical data container.

DELETE /{accountId}/logical-data-container-name/data/{dataObjectId} HTTP/1.1

In various implementations, data objects may be deleted in response to a customer request or may be deleted automatically according to a user-specified or default expiration date. In some cases, data objects may be rendered inaccessible to customers upon an expiration time but remain recoverable during a grace period beyond the expiration time. In various implementations, the grace period may be based on configurable information such as customer configuration, service-level agreement terms, and the like. In some cases, a customer may be provided the abilities to query or receive notifications for pending data deletions and/or cancel one or more of the pending data deletions. As one example, a customer may set up notification configurations associated with a logical data container such that the customer will receive notifications of certain events pertinent to the logical data container. Such events may include the completion of a data retrieval job request, the completion of metadata request, deletion of data objects or logical data containers and the like. As an example, archival data storage system 206 may also provide metadata application programming interfaces for retrieving and managing metadata such as metadata associated with logical data containers. In various implementations, such requests may be handled asynchronously (where results are returned later) or synchronously (where results are returned immediately).

Still referring to FIG. 2, in an example, at least some of the application programming interface requests discussed above are handled by application programming interface request handler 218 as part of front end 208. For example, application programming interface request handler 218 may decode and/or parse an incoming application programming interface request to extract information, such as uniform resource identifier, requested action and associated parameters, identity information, data object identifiers and the like. In addition, application programming interface request handler 218 invokes other services (described below), where necessary, to further process the application programming interface request.

The front end 208 may include an authentication service 220 that may be invoked, for example, by application programming interface handler 218, to authenticate an application programming interface request. For example, in some cases, authentication service 220 may verify identity information submitted with the application programming interface request such as username and password Internet Protocol address, cookies, digital certificate, digital signature and the like. In other cases, authentication service 220 may require the customer to provide additional information or perform additional steps to authenticate the request, such as required in a multifactor authentication scheme, under a challenge-response authentication protocol and the like.

The front end 208 may include an authorization service 222 that may be invoked, for example, by application programming interface handler 218, to determine whether a requested access is permitted according to one or more policies determined to be relevant to the request. As an example, authorization service 222 verifies that a requested access is directed to data objects contained in the requestor's own logical data containers or which the requester is otherwise authorized to access. In some cases, authorization service 222 or other services of front end 208 may check the validity and integrity of a data request based at least in part on information encoded in the request, such as validation information encoded by a data object identifier.

The front end 208 may include a metering service 224 that monitors service usage information for each customer such as data storage space used, number of data objects stored, data requests processed and the like. The front end 208 may also include an accounting service 226 that performs accounting and billing-related functionalities based, for example, on the metering information collected by the metering service 224, customer account information and the like. For example, a customer may be charged a fee based on the storage space used by the customer, size and number of the data objects, types and number of requests submitted, customer account type, service-level agreement and the like.

The front end 208 batch may process some or all incoming requests. For example, the front end 208 may wait until a certain number of requests has been received before processing (e.g., authentication, authorization, accounting and the like) the requests. Such a batch processing of incoming requests may be used to gain efficiency.

In some implementations, the front end 208 may invoke services provided by other subsystems of the archival data storage system to further process an application programming interface request. For example, front end 208 may invoke services in metadata plane 216 to fulfill metadata requests. For another example, front end 208 may stream data in and out of control plane for direct I/O 210 for data storage and retrieval requests, respectively.

Referring now to control plane for direct I/O 210 illustrated in FIG. 2, in various implementations, control plane for direct I/O 210 provides services that create, track and manage jobs created because of customer requests. As discussed above, a job may be a customer-initiated activity that may be performed asynchronously to the initiating request, such as data retrieval, storage, metadata queries, or the like. The control plane for direct I/O 210 may include a job tracker 230 that is configured to create job records or entries corresponding to customer requests, such as those received from application programming interface request handler 218, and monitor the execution of the jobs. In various implementations, a job record may include information related to the execution of a job such as a customer account identifier, job identifier, data object identifier, reference to payload data cache 228 (described below), job status, data validation information and the like. In some cases, job tracker 230 may collect information necessary to construct a job record from multiple requests. For example, when a large amount of data is requested to be stored, data upload may be broken into multiple requests, each uploading a portion of the data. In such a case, job tracker 230 may maintain information to keep track of the upload status to ensure that all data parts have been received before a job record is created. In some cases, job tracker 230 also obtains a data object identifier associated with the data to be stored and provides the data object identifier, for example, to a front end service to be returned to a customer. Such data object identifier may be obtained from data plane 214 services such as storage node manager 244, storage node registrar 248, and the like, described below.

The control plane for direct I/O 210 may include a job tracker store 232 for storing job entries or records. In various implementations, job tracker store 232 may be implemented by a NoSQL data management system, such as a key-value data store, a relational database management system ("RDBMS") or any other data storage system. In some cases, data stored in job tracker store 232 may be partitioned to enable fast enumeration of jobs that belong to a specific customer, facilitate efficient bulk record deletion, parallel processing by separate instances of a service and the like. For example, job tracker store 232 may implement tables that are partitioned according to customer account identifiers and that use job identifiers as range keys. The job tracker store 232 may be further sub-partitioned based on time (such as job expiration time) to facilitate job expiration and cleanup operations. As an example, transactions against job tracker store 232 may be aggregated to reduce the total number of transactions. For example, in some implementations, a job tracker 230 may perform aggregate multiple jobs corresponding to multiple requests into one single aggregated job before inserting it into job tracker store 232.

The job tracker 230 may be configured to submit the job for further job scheduling and planning, for example, by services in common control plane 212. Additionally, job tracker 230 may be configured to monitor the execution of jobs and update corresponding job records in job tracker store 232 as jobs are completed. In some cases, job tracker 230 may be further configured to handle customer queries such as job status queries. In some cases, job tracker 230 also provides notifications of job status changes to customers or other services of the archival data storage system. For example, when a data retrieval job is completed, job tracker 230 may cause a customer to be notified (for example, using a notification service) that data is available for download. As another example, when a data storage job is completed, job tracker 230 may notify a cleanup agent 234 to remove payload data associated with the data storage job from a transient payload data cache 228, described below.

The control plane for direct I/O 210 may include a payload data cache 228 for providing transient data storage services for payload data transiting between data plane 214 and front end 208. Such data includes incoming data pending storage and outgoing data pending customer download. In some examples, "transient data store" is used interchangeably with temporary or staging data store to refer to a data store that is used to store data objects before they are stored in an archival data storage described or to store data objects that are retrieved from the archival data storage. A transient data store may provide volatile or non-volatile (durable) storage. In most cases, while potentially usable for persistently storing data, a transient data store is intended to store data for a shorter period than an archival data storage system and may be less cost-effective than the data archival storage system described. In one case, transient data storage services provided for incoming and outgoing data may be differentiated. For example, data storage for the incoming data, which is not yet persisted in archival data storage, may provide higher reliability and durability than data storage for outgoing (retrieved) data, which is already persisted in archival data storage. In another case, transient storage may be optional for incoming data; that is, incoming data may be stored directly in archival data storage without being stored in transient data storage such as payload data cache 228, for example, when the system has sufficient bandwidth and/or capacity to do so.

The control plane for direct I/O 210 may also include a cleanup agent 234 that monitors job tracker store 232 and/or payload data cache 228 and removes data that is no longer needed. For example, payload data associated with a data storage request may be safely removed from payload data cache 228 after the data is persisted in permanent storage (e.g., data plane 214). On the reverse path, data staged for customer download may be removed from payload data cache 228 after a configurable period of time (e.g., 30 days since the data is staged) or after a customer indicates that the staged data is no longer needed.

The cleanup agent 234 may remove a job record from job tracker store 232 when the job status indicates that the job is complete or aborted. As discussed above, in some cases, job tracker store 232 may be partitioned to enable faster cleanup. In one case where data is partitioned by customer account identifiers, cleanup agent 234 may remove an entire table that stores jobs for a particular customer account when the jobs are completed instead of deleting individual jobs one at a time. In another case where data is further sub-partitioned based on job expiration time, cleanup agent 234 may bulk-delete a whole partition or table of jobs after all the jobs in the partition expire. In other cases, cleanup agent 234 may receive instructions or control messages (such as indication that jobs are completed) from other services such as job tracker 230 that cause the cleanup agent 234 to remove job records from job tracker store 232 and/or payload data cache 228.

Referring now to common control plane 212 illustrated in FIG. 2, in various implementations, common control plane 212 provides a queue-based load leveling service to dampen peak to average load levels (jobs) coming from control plane for I/O 210 and to deliver manageable workload to data plane 214. The common control plane 212 may include a job request queue 236 for receiving jobs created by job tracker 230 in control plane for direct I/O 210, described above, a storage node manager job store 240 from which services from data plane 214 (e.g., storage node managers 244) pick up work to execute and a request balancer 238 for transferring job items from job request queue 236 to storage node manager job store 240 in an intelligent manner.

The job request queue 236 may provide a service for inserting items into and removing items from a queue (e.g., first-in-first-out (FIFO) or first-in-last-out (FILO)), a set or any other suitable data structure. Job entries in the job request queue 236 may be similar to or different from job records stored in job tracker store 232, described above.

The common control plane 212 may also provide a durable high efficiency job store, storage node manager job store 240, that allows services from data plane 214 (e.g., storage node manager 244, anti-entropy watcher 252) to perform job planning optimization, check pointing and recovery. As an example, storage node manager job store 240 allows the job optimization such as batch processing, operation coalescing and the like by supporting scanning, querying, sorting or otherwise manipulating and managing job items stored in storage node manager job store 240. In an example, a storage node manager 244 scans incoming jobs and sorts the jobs by the type of data operation (e.g., read, write or delete), storage locations (e.g., volume, disk), customer account identifier and the like. The storage node manager 244 may then reorder, coalesce, group in batches or otherwise manipulate and schedule the jobs for processing. For example, in one case, the storage node manager 244 may batch process all the write operations before all the read and delete operations. In another case, the storage node manager 244 may perform operation coalescing. For another example, the storage node manager 244 may coalesce multiple retrieval jobs for the same object into one job or cancel a storage job and a deletion job for the same data object where the deletion job comes after the storage job.

The storage node manager job store 240 may be partitioned, for example, based on job identifiers, so as to allow independent processing of multiple storage node managers 244 and to provide even distribution of the incoming workload to all participating storage node managers 244. In various implementations, storage node manager job store 240 may be implemented by a NoSQL data management system, such as a key-value data store, a RDBMS or any other data storage system.

The request balancer 238 may provide a service for transferring job items from job request queue 236 to storage node manager job store 240 to smooth out variation in workload and to increase system availability. For example, request balancer 238 may transfer job items from job request queue 236 at a lower rate or at a smaller granularity when there is a surge in job requests coming into the job request queue 236 and vice versa when there is a lull in incoming job requests so as to maintain a relatively sustainable level of workload in the storage node manager store 240. In some cases, such sustainable level of workload is around the same or below the average workload of the system.

The job items that are completed may be removed from storage node manager job store 240 and added to the job result queue 242. As an example, data plane 214 services (e.g., storage node manager 244) may be responsible for removing the job items from the storage node manager job store 240 and adding them to job result queue 242. In some cases, job request queue 242 is implemented in a similar manner as job request queue 236, discussed above.

Referring now to data plane 214 illustrated in FIG. 2. In various implementations, data plane 214 provides services related to long-term archival data storage, retrieval and deletion, data management and placement, anti-entropy operations and the like. In various implementations, data plane 214 may include any number and type of storage entities such as data storage devices (such as tape drives, hard disk drives, solid state devices, and the like), storage nodes or servers, data centers and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of data centers, servers or data storage devices, which in turn may be local or remote relative to one another. In various implementations, physical storage entities may be designed for minimizing power and cooling costs by controlling the portions of physical hardware that are active (e.g., the number of hard drives that are actively rotating). As an example, physical storage entities may implement techniques, such as shingled magnetic recording, to increase storage capacity.

In an environment illustrated by FIG. 2, one or more storage node managers 244 each controls one or more storage nodes 246 by sending and receiving data and control messages. Each storage node 246 in turn controls a (potentially large) collection of data storage devices such as hard disk drives. In various implementations, a storage node manager 244 may communicate with one or more storage nodes 246 and a storage node 246 may communicate with one or more storage node managers 244. As an example, storage node managers 244 may be implemented by one or more computing devices that are capable of performing relatively complex computations such as digest computation, data encoding and decoding, job planning and optimization and the like. In some cases, storage nodes 246 are implemented by one or more computing devices with less powerful computation capabilities than storage node managers 244. Further, in some cases the storage node manager 244 may not be included in the data path. For example, data may be transmitted from the payload data cache 228 directly to the storage nodes 246 or from one or more storage nodes 246 to the payload data cache 228. In this way, the storage node manager 244 may transmit instructions to the payload data cache 228 and/or the storage nodes 246 without receiving the payloads directly from the payload data cache 228 and/or storage nodes 246. In various implementations, a storage node manager 244 may send instructions or control messages to any other components of the archival data storage system 206 described to direct the flow of data.

The storage node manager 244 may serve as an entry point for jobs coming into and out of data plane 214 by picking job items from common control plane 212 (e.g., storage node manager job store 240), retrieving staged data from payload data cache 228 and performing necessary data encoding for data storage jobs and requesting appropriate storage nodes 246 to store, retrieve or delete data. Once the storage nodes 246 finish performing the requested data operations, the storage node manager 244 may perform additional processing, such as data decoding and storing retrieved data in payload data cache 228 for data retrieval jobs, and update job records in common control plane 212 (e.g., removing finished jobs from storage node manager job store 240 and adding them to job result queue 242).

The storage node manager 244 may perform data encoding according to one or more data encoding schemes before data storage to provide data redundancy, security and the like. Such data encoding schemes may include encryption schemes, redundancy encoding schemes such as erasure encoding, redundant array of independent disks (RAID) encoding schemes, replication and the like. Likewise, as an example, storage node managers 244 may perform corresponding data decoding schemes, such as decryption, erasure-decoding and the like, after data retrieval to restore the original data.

As discussed above in connection with storage node manager job store 240, storage node managers 244 may implement job planning and optimizations such as batch processing, operation coalescing and the like to increase efficiency. In some cases, jobs are partitioned among storage node managers so that there is little or no overlap between the partitions. Such cases facilitate parallel processing by multiple storage node managers, for example, by reducing the probability of racing or locking. In various implementations, data plane 214 may be implemented to facilitate data integrity. For example, storage entities handling bulk data flows, such as storage node managers 244 and/or storage nodes 246, may validate the digest of data stored or retrieved, check the error-detection code to ensure integrity of metadata and the like.

In various implementations, data plane 214 may be implemented to facilitate scalability and reliability of the archival data storage system. For example, in one case, storage node managers 244 maintain no or little internal state so that they can be added, removed or replaced with little adverse impact. In one case, each storage device is a self-contained and self-describing storage unit capable of providing information about data stored thereon. Such information may be used to facilitate data recovery in case of data loss. Furthermore, in one case, each storage node 246 is capable of collecting and reporting information about the storage node, including the network location of the storage node and storage information of connected storage devices to one or more storage node registrars 248 and/or storage node registrar stores 250. In some cases, storage nodes 246 perform such self-reporting at system start up time and periodically provide updated information. In various implementations, such a self-reporting approach provides dynamic and up-to-date directory information without the need to maintain a global namespace key map or index, which can grow substantially as large amounts of data objects are stored in the archival data system.

The data plane 214 may also include one or more storage node registrars 248 that provide directory information for storage entities and data stored thereon, data placement services and the like. Storage node registrars 248 may communicate with and act as a front end service to one or more storage node registrar stores 250, which provide storage for the storage node registrars 248. In various implementations, storage node registrar store 250 may be implemented by a NoSQL data management system, such as a key-value data store, a RDBMS or any other data storage system. In some cases, storage node registrar stores 250 may be partitioned to enable parallel processing by multiple instances of services. As discussed above, in one case, information stored at storage node registrar store 250 is based at least partially on information reported by storage nodes 246 themselves.

The storage node registrars 248 may provide directory services, for example, to storage node managers 244 that want to determine which storage nodes 246 to contact for data storage, retrieval and deletion operations. For example, given a volume identifier provided by a storage node manager 244, storage node registrars 248 may provide, based on a mapping maintained in a storage node registrar store 250, a list of storage nodes that host volume components corresponding to the volume identifier. Specifically, in one case, storage node registrar store 250 stores a mapping between a list of identifiers of volumes or volume components and endpoints, such as Domain Name System (DNS) names, of storage nodes that host the volumes or volume components.

In some examples, a "volume" may be a logical storage space within a data storage system in which data objects may be stored. A volume may be identified by a volume identifier. Data for a volume may reside in one physical storage device (e.g., a hard disk) or span across multiple storage devices. In the latter case, a volume comprises volume components each residing on a different storage device. In some examples, a "volume component" may be a portion of a volume that is physically stored in a storage entity such as a storage device. Volume components for the same volume may be stored on different storage entities. In one case, when data is encoded by a redundancy encoding scheme (e.g., erasure coding scheme, RAID, replication), each encoded data component or "shard" may be stored in a different volume component to provide fault tolerance and isolation. In some cases, a volume component is identified by a volume component identifier that includes a volume identifier and a shard slot identifier. In some examples, a "shard slot" identifies a particular shard, row, or stripe of data in a redundancy encoding scheme. For example, in one case, a shard slot corresponds to an erasure coding matrix row. In some cases, storage node registrar store 250 also stores information about volumes or volume components such as total, used and free space, number of data objects stored and the like.

The data plane 214 may also include a storage allocator 256 for allocating storage space (e.g., volumes) on storage nodes to store new data objects, based at least in part on information maintained by storage node registrar store 250, to satisfy data isolation and fault tolerance constraints. In some cases, storage allocator 256 requires manual intervention.

In some cases, the data plane 214 also includes an anti-entropy watcher 252 for detecting entropic effects and initiating anti-entropy correction routines. For example, anti-entropy watcher 252 may be responsible for monitoring activities and status of all storage entities such as storage nodes, reconciling live or actual data with maintained data and the like. In various implementations, entropic effects include performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 252 may detect such effects and in some cases may preemptively and/or reactively institute anti-entropy correction routines and/or policies.

The anti-entropy watcher 252 causes storage nodes 246 to perform periodic anti-entropy scans on storage devices connected to the storage nodes. Anti-entropy watcher 252 may also inject requests in job request queue 236 (and subsequently job result queue 242) to collect information, recover data and the like. In some cases, anti-entropy watcher 252 may perform scans, for example, on cold index store 262, described below, and storage nodes 246, to ensure referential integrity.

Information stored at storage node registrar store 250 may be used by a variety of services such as storage node registrar 248, storage allocator 256, anti-entropy watcher 252 and the like. For example, storage node registrar 248 may provide data location and placement services (e.g., to storage node managers 244) during data storage, retrieval and deletion. For example, given the size of a data object to be stored and information maintained by storage node registrar store 250, a storage node registrar 248 may determine where (e.g., volume) to store the data object and provides an indication of the storage location of the data object which may be used to generate a data object identifier associated with the data object. As another example, the storage allocator 256 may use information stored in storage node registrar store 250 to create and place volume components for new volumes in specific storage nodes to satisfy isolation and fault tolerance constraints. As yet another example, the anti-entropy watcher 252 may use information stored in storage node registrar store 250 to detect entropic effects such as data loss, hardware failure and the like.

In some cases, data plane 214 also includes an orphan cleanup data store 254, which is used to track orphans in the storage system. In some examples, an "orphan" may refer to a stored data object that is not referenced by any external entity. In some examples, this may also be referred to as "dangling" data. In various implementations, orphan cleanup data store 254 may be implemented by a NoSQL data management system, such as a key-value data store, an RDBMS or any other data storage system. In some cases, storage node registrars 248 stores object placement information in orphan cleanup data store 254. Subsequently, information stored in orphan cleanup data store 254 may be compared, for example, by an anti-entropy watcher 252, with information maintained in metadata plane 216. If an orphan is detected, in some cases, a request is inserted in the common control plane 212 to delete the orphan.

Referring now to metadata plane 216 illustrated in FIG. 2. In various implementations, metadata plane 216 provides information about data objects stored in the system for inventory and accounting purposes, to satisfy customer metadata inquiries and the like. In the illustrated example, metadata plane 216 includes a metadata manager job store 258 which stores information about executed transactions based on entries from job result queue 242 in common control plane 212. In various implementations, metadata manager job store 258 may be implemented by a NoSQL data management system, such as a key-value data store, a RDBMS or any other data storage system. In some cases, metadata manager job store 258 is partitioned and sub-partitioned, for example, based on logical data containers, to facilitate parallel processing by multiple instances of services such as metadata manager 260.

In the illustrative example, metadata plane 216 also includes one or more metadata managers 260 for generating a cold index of data objects (e.g., stored in cold index store 262) based on records in metadata manager job store 258. In some examples, a "cold" index may be an index that is updated infrequently. In various implementations, a cold index is maintained to reduce cost overhead. In some cases, multiple metadata managers 260 may periodically read and process records from different partitions in metadata manager job store 258 in parallel and store the result in a cold index store 262.

In some cases, cold index store 262 may be implemented by a reliable and durable data storage service. In some cases, cold index store 262 is configured to handle metadata requests initiated by customers. For example, a customer may issue a request to list all data objects contained in a given logical data container. In response to such a request, cold index store 262 may provide a list of identifiers of all data objects contained in the logical data container based on information maintained by cold index 262. In some cases, an operation may take a relative long period and the customer may be provided a job identifier to retrieve the result when the job is done. In other cases, cold index store 262 is configured to handle inquiries from other services, for example, from front end 208 for inventory, accounting and billing purposes.

In some cases, metadata plane 216 may also include a container metadata store 264 that stores information about logical data containers such as container ownership, policies, usage and the like. Such information may be used, for example, by front end 208 services, to perform authorization, metering, accounting and the like. In various implementations, container metadata store 264 may be implemented by a NoSQL data management system, such as a key-value data store, a RDBMS or any other data storage system.

As described, in various implementations, the archival data storage system 206 described is implemented to be efficient and scalable. As an example, batch processing and request coalescing may be used at various stages (e.g., front end request handling, control plane job request handling, data plane data request handling) to improve efficiency. As another example, processing of metadata such as jobs, requests and the like may be partitioned to facilitate parallel processing of the partitions by multiple instances of services.

Data elements stored in the archival data storage system (such as data components, volumes, described below) may be self-describing to avoid the need for a global index data structure. As an example, data objects stored in the system may be addressable by data object identifiers that encode storage location information. As another example, volumes may store information about which data objects are stored for the volume and storage nodes and devices storing such volumes may collectively report their inventory and hardware information to provide a global view of the data stored in the system (such as evidenced by information stored in storage node registrar store 250). In such a case, the global view is provided for efficiency only and not required to locate data stored in the system.

In various implementations, the archival data storage system described is implemented to improve data reliability and durability. As an example, a data object is redundantly encoded into data components and stored across different data storage entities to provide fault tolerance. As another example, data elements may have multiple levels of integrity checks. Parent/child relations may always have additional information to ensure full referential integrity. As an example, bulk data transmission and storage paths may be protected by having the initiator pre-calculate the digest on the data before transmission and subsequently supply the digest with the data to a receiver. The receiver of the data transmission is responsible for recalculation, comparing, and then acknowledging to the sender that the data includes the recalculated digest. Such data integrity checks may be implemented, for example, by front end services, transient data storage services, data plane storage entities and the like described above.

Figure 3:
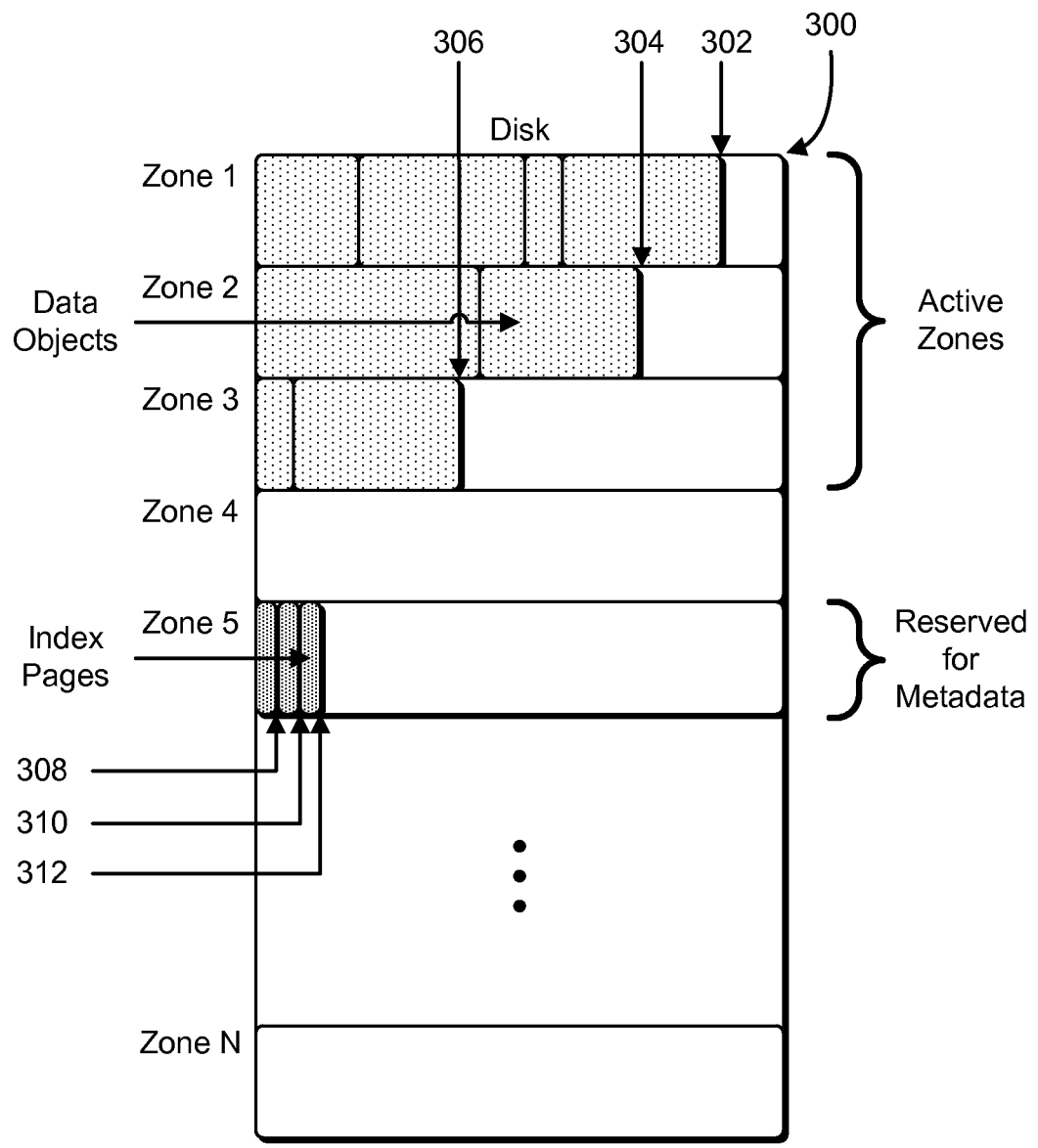
FIG. 3 illustrates an example of a drive with multiple zones in accordance with an embodiment.

FIG. 3 illustrates an example of a drive 300 having multiple zones of an embodiment of the present disclosure. As illustrated in FIG. 3, the drive 300 may be divided into multiple logical sections (zones). In some cases, zones may be of a predetermined fixed size, whereas in other cases zones may be variably sized. The drive 300 may be any type of computer-readable media capable of hosting a file system, such as a shingled magnetic recording drive, a tape drive, hard disk drive, a solid-state drive, and a random access memory drive. Although some of the examples of the present disclosure are described in reference to sequential-write/append-only media, it is contemplated that random-access and other types of media may be also used with the multi-active zone file system of the present disclosure. The drive 300 illustrated in FIG. 3 is shown to have three active zones, Zones 1-3, out of N zones.

The zones may be used to store (e.g., PUT) data objects for volumelets. As noted, volumelets may be erasure-coded volumes that span multiple zones and may be larger than an individual zone, and data objects for multiple volumelets may share the same zone. Note that from the perspective of the multi-active zone file system, whether data is sharded or whether data is associated with a volume or a sharding volumelet may be immaterial; that is, the multi-active zone file system may receive data, whether sharded or not and whether associated with a volume or volumelet or not, and store the data on one or more zones as data objects in any case. In some cases, the multi-active zone file system may implement heuristics to minimize zone sharing by volumelets; such as, for example, preferring to open and write volumelet data objects to an empty zone rather than writing to a zone already containing data objects of another volumelet. As such, a data object may be appended to the log head (i.e., the position of the last-write pointer) of the zone and its location may then be recorded in an index page or may be recorded when a checkpoint is generated.

On a PUT, a "log manager" may receive the request to write records, determine which log head to write to, compute whether any sync records may be required, queue the record for write, and pass the records to the "volumelet index." For a checkpoint, the log manager may note the current head pointers, report this back to a "checkpointer," and pass the checkpoint request to the volumelet index. On a read, the log manager may simply read the requested record and respond to the requestor with resulting data.

In some examples, the "volumelet index" may refer to an index that tracks metadata for which volumelets are present. Upon receiving a record, if it is a record that updates the volume metadata, then this may be applied to the index's in-memory copy of the metadata. Otherwise, the record may be annotated with whether the volumelet in question is present, and the record may be forwarded to the data object index. In some examples, the "data object index" may be an index that tracks where data objects are located. When passed a record, if the record is annotated with a note that the volumelet is present, the data object index may add the record to the index or update an existing data object index entry. For data that spans multiple records, the data object index may track the incomplete fragments separately. A space index may be used to track the live space in each zone on a per-volumelet basis, and this data may be used in determining which zones to zone clean or which volumelets to migrate.

When an active zone becomes full and another zone is needed for writing, the active zone may be closed and a new zone may be activated for writing. An index may be utilized to find data written to the zones. The index may be in the form of a tree, such as a B+ tree or two-level tree, with index pages as nodes of the index root node. In the multi-active zone file system, separate metadata zones may be reserved for storing the index pages of the index and other metadata. Note that while FIG. 3 depicts a single metadata zone for index pages, index pages may be stored on multiple metadata zones reserved for indexes and other metadata; however, it may be that only one such zone for index pages may be active at a given time. The index pages comprise the index, which may be a single entity that catalogs the locations of the data objects of all volumelets. Each index page of the index may refer to a specific data object of a volumelet, and may comprise an identifier for the data object and information indicating where the data object is located (e.g., zone identifier and an offset). The index pages, therefore, may be quite small (e.g., 128 kilobytes), and a volumelet may have several index pages for its data objects.

Although the data plane component of the multi-active zone file system may be responsible for recording data objects and DELETE events, the metadata plane may handle tracking the location of data objects and volume component metadata. The metadata plane may be responsible for storing checkpoints for cold starting the file system, recording the index to data object record locations, recording volumelet metadata, and tracking statistics on zone utilization for use in zone cleaning. Two zones on a disk may be reserved for the metadata plane, and, at any given time, one such zone may be considered active. The active zone may contain at least one full checkpoint of the file system. As the active zone approaches full, a new full checkpoint may be generated on the inactive zone, whereupon the inactive zone becomes the active zone. Within each zone on a disk, a pointer to the last valid checkpoint of that zone may be inserted at regular intervals, or, if no checkpoint has been generated, a flag point indicating that the checkpoint has not yet been generated. The checkpoint zones may also contain sets of index pages interspersed with the checkpoints.

The data object index may be a tree that may be used to locate data records on disk for all data objects stored in the file system. In a constrained memory environment, it may not be possible for the entire data object index to be present in memory at once. However, by managing the workload such that the number of volumelets being simultaneously written is minimized and by arranging for data objects to be written in an order approximate to the data object IDs, the number of sets of data object index pages needed in memory may be reduced.

Index pages may be kept in memory and be written to disk when the file system needs available memory or in preparation for a checkpoint. Index pages may be written before the checkpoint that references the index pages so that the file system may be consistently recovered if a crash occurs. Root nodes of the index may be stored in the checkpoint, while child nodes of the index may be written to the log, and, during a cold start, any index nodes found after a valid checkpoint may be ignored in favor of replaying log heads.

The index structure may be a two-level tree, with its root in the checkpoint. The checkpoint may contain a list of ranges of volumelet identifiers, data object identifier pairs, and a disk offset of associated index pages. These index pages may thereby contain a sorted list of index entries, comprising a volumelet identifier, data object identifier, creation timestamp, data object metadata hash, data object size, offsets of each data object record, and a flag indicating that the data object has been found in the most-recent fixity check scan. Additionally, each set of index pages may contain the fixity check sequence number that was current at the time the set of index pages was last modified.

Metadata zones may also include index records. In some examples, "index records" may be tree nodes (e.g., B+ tree nodes) used for storing the indexes of data record locations. The root node of the tree may be part of the checkpoint. Child nodes of the tree may be written to a metadata zone either in response to committing memory to persistent storage or in preparation for a checkpoint that references the child nodes. Index nodes may not be directly used during a cold start; that is, index nodes located after the last valid checkpoint may be ignored for replaying the log heads.

In some embodiments, checkpoints may be stored on a metadata zone. In other embodiments, the checkpoint may be stored on a separate non-sequential (e.g., random read/write) drive or zone. The checkpoint may be a data structure that summarizes a state of the entire file system at the time the checkpoint was generated. For example, at the time the checkpoint is generated, the checkpoint may include locations of the current write pointers for each of the zones (illustrated by Zone 1 write pointer 302, Zone 2 write pointer 304, and Zone 3 write pointer 306), including the write pointers for the index pages (illustrated by index page write pointers 308-12), such as index page write pointer 310 illustrated in FIG. 3. The checkpoint may also include other metadata, such as information about the volumelets stored on the zones. In a case where operations (e.g., writes, deletes, etc.) have been performed after a checkpoint was generated but before the generation of a new checkpoint (such as may occur in the case of a crash or restart of a computer system), the most-recent checkpoint may be read and a replay process may be performed from this state to trace the operations of the file system until the last stable state of the file system is determined. The checkpoint thereby provides a snapshot of the state of the file system at a certain point in time so that the file system may be restored, such as after a cold start, without replaying every operation from the very beginning. The checkpoint may also include information to aid in zone cleaning.

The data plane component may comprise a majority of the zones on the disk. Each zone may be in one of three states: open, close, or empty. Initially, all zones may be empty, and transition to open when actively accepting writes. When zones are closed, they may take no more writes until zone cleaned. When zone cleaned, the zone may return to an empty state. At any given time, multiple zones may be open and accepting writes. In some examples, a "log head" may be the front of the log, which may correspond to the write pointer of an open zone. The selection of which log head to use for a write may be controlled by a heuristic, and the performance of this heuristic may be critical to reducing zone cleaning overhead.

In some examples, a "record" may be a unit of data written to the log. Records may include data objects, data object deletion events, and volumelet mutation events. Data record types may include inline data, non-inline data, delete records, sync records, continuation records, closure records, and volumelet records. In some examples, "inline data" may be data objects that fit within a single record; all data for the data object, including the data object header, may be recorded as a single record and simultaneously may act as a commit for the data object. In some examples, a "non-inline data" may be larger data objects whose data may be broken into multiple records, potentially on different zones. Each record for non-inline data may also have a data object incarnation value unique to a particular PUT attempt on the particular disk; once all parts of the data object, as determined by the size information of the last record, are written, the data object may be considered committed. In some examples, a "delete record" may be a record that deletes a single data object. In some examples, a "sync record" (also referred to as "sync pointer") may be a record that applies an ordering constraint and the sync record may be used to ensure that deletes are correctly ordered with respect to data records. In some examples, a "continuation record" may be a record that indicates that another zone has been opened. The new zone may be implicitly ordered after the continuation record. In some examples, a "closure record" may be a record that indicates whether a zone is closed and not receiving any new writes. In some examples, recording a "volumelet event" may refer to recording metadata that indicates the creation, deletion, or metadata changes for a volumelet.

In some examples, a "mutation event" may be an operation that changes a volumelet on a disk, such as a volumelet creation and deletion operations. In some examples, a "log" may be a file system log, which is a data structure of a log-structured file system to which records may be appended sequentially. In some examples, a "data object index" may be data stored as a tree, such as a B+ tree or two-level tree, that may be used to track the physical location of all data objects stored by the file system on disk. In some examples, a "space index" may be an index that tracks the amount of live data and free space on all of the zones on a per-volumelet basis. In some examples, a "volume index" may be an index that tracks the metadata for volumelets that are present in the file system. In some examples, an "index record" may be an index page used to record the zone locations of one or more data objects in the multi-active zone file system.

Figure 4:
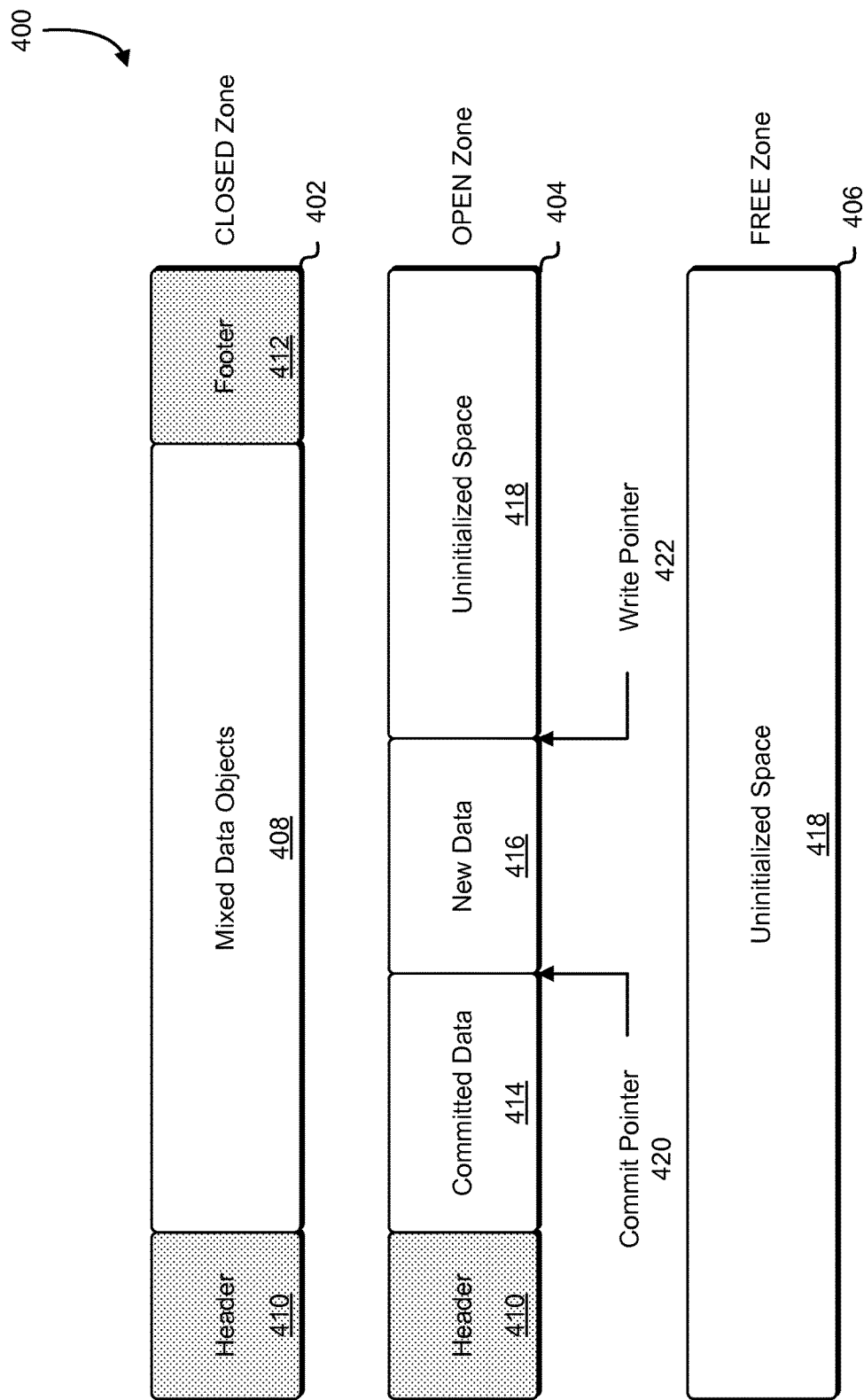
FIG. 4 illustrates an example of zones in open, closed, and free states in accordance with an embodiment.

FIG. 4 is an illustration 400 of three possible states for a zone in accordance with an embodiment of the present disclosure. Zones may be in one of three states, open, closed, or free, as respectively represented by closed zone 402, open zone 404, and free zone 406 in FIG. 4. A zone may contain a variety of record types, zone headers, and zone footers, represented by unordered and new data 414 and 416, zone header 410, and zone footer 412 in FIG. 4. In some examples, the open zone 402 may be a log head of a log-structured file system that is available to be written to; i.e., the zone may have available space (i.e., uninitialized space) and may be actively accepting writes of records. Active zones may be open zones of the file system and may have at least one zone header written. Multiple zones may be open at once. Open zones include zones for storing data objects for volumelet and zones for storing metadata, such as index pages and checkpoints.

The open zone 404 may have a zone header 410, which may comprise a disk identifier, format version metadata, a sequence number that changes when the zone is reset (e.g., after a zone is cleaned and re-opened), and a checksum of the content of the zone header. The open zone 404 may be comprised of the header 410 and no live data, or may be comprised of the header 410 and one or more data records (collectively represented as committed data 414 and new data 416). As noted, data records may include inline data, non-inline data, sets of index pages (also referred to as index segments), delete records, volumelet events, zone continuations, sync records, and checkpoints. Inline data may be data objects that fit within a single record; i.e., all data for the data object, including the data object header, may be recorded as a single record, which simultaneously acts as a commit for the data object. Non-inline data comprise data larger than one record that are persisted as several data objects, potentially on different zones. Once all parts of the data are committed, the non-inline data may be considered committed.

Sets of index pages may be nodes of the file system tree used for storing the indexes of data record locations. Delete records may indicate the deletion of a data object. As noted, volumelet event records may be records that indicate the creation, deletion, or metadata changes for volumelets. Zone continuation records may indicate that another zone has been opened. All records in the new zone may be implicitly ordered after the continuation record (note that the old zone may remain open until a zone footer is written). Sync records may apply an ordering constraint, and the sync records may be used to ensure that deletes are correctly ordered with respect to data records. Checkpoints may be written to normal sequential zones as a data record if random-write space is not available.

The data represented by the committed data 414 may be data that has been recorded before the last checkpoint and may be considered unordered in the sense that the data may be located using pointers stored in the index. The new data 416 may be data recorded after the last checkpoint and may be considered to be partially ordered. Being able to determine the ordering of records that appear after the checkpoint may be important for being able to successfully recover the state of the multi-active zone file system after a cold start, particularly because multiple zones may be open for writes simultaneously making it possible for writes to occur in zones which, if interpreted in the wrong order, may result in an inconsistent file system state. Thus, the commit pointer 420 may represent the position of the write pointer 422 when the most-recent checkpoint was generated, and the new data 416 may be considered to be any data that was written to the open zone 404 after the generation of the checkpoint.

The write pointer 422 may be a pointer that indicates the end of valid data (i.e., the last position where data was written) of a zone in an append-only embodiment of the present disclosure. Data may only be written to the zone in advance of the position indicated by the write pointer 422. Thus, as data is written sequentially to the open zone 404, the write pointer 422 advances to the end of the open zone 404.

The commit pointer 420 may indicate the position of the write pointer 422 the last time the data was committed (i.e., checkpoint generated). For example, initially the write pointer 422 may point to the same location as the commit pointer 420. However, when a write command is processed, the write pointer 422 may advance as data is written to the open zone 404. When the next checkpoint is generated, the commit pointer 420 becomes the current position of the write pointer 422. Thus, during a replay of the file system, the replay may read the most-recent checkpoint to determine the location of the commit pointer 420 for the zone and then follow the operations that were performed in the zone (e.g., using sync pointers) until the actual write pointer 422 is reached.

The uninitialized space 418 in the open zone 404 may be space on the zone that has never been written to, or may be space that may have previously contained data, but the data has been deleted or migrated and, thus, the space occupied by the data may be overwritten with new data. Such uninitialized space is the same as the uninitialized space on the free zone 406; that is, the uninitialized space 418 in the free zone 406 may be space that has never been used or, the uninitialized space 418 may be space once occupied by data in a closed zone 402 or an open zone 404, but the zone may have been zone cleaned, with all of the live data may have been copied from the zone to another zone and the write pointer reset, transforming the zone into the free zone 406. The free zone 406 may therefore be a zone that contains no active data and does not accept write requests until it has been explicitly opened; i.e., the free zone may not be written to until it has been transformed into an open zone 404, which in some cases may comprise writing a zone header to the free zone 404 and/or setting a write pointer to a non-null value. A zone may be free if there is no referenced data in the zone and the zone is not open (i.e., the file system is free to reset the zone write pointer and transition the zone to open at any time).

A closed zone 402 may be a zone that was once active, may or may not contain live (i.e., not obsolete) data, but is not actively accepting further write requests. In some cases, a closed zone may have been fully written, and no more data may be appended until the zone is cleaned and reset. In other cases, a zone may have been closed before it was written because an EARLY_CLOSE_THRESHOLD was exceeded for the zone. Note that in some cases, closed zones may contain live data, whereas in other cases closed zones may contain data that was once live but has since been deleted, migrated, or otherwise rendered obsolete. In still other cases, closed zones may have never contained valid data; such as, for example, if the data written to the zone experienced a data corruption event before the zone was closed. Likewise, closed zones may contain a mix of one or more of live, obsolete, and invalid data. In any case, a closed zone may not actively accept further write requests until zone cleaned.

In some cases, the closed zone 402 has a zone footer 412 that has been written to close the zone. The live data of the closed zone 402 may be comprised of data objects for a single volumelet or may be comprised of mixed data objects 408 (i.e., data objects for multiple volumelets) as illustrated in FIG. 4. Similar to the open zone 404 (since the closed zone 404 may have been an open zone 404 before it was closed), the closed zone may have a zone header 410. Additionally, the closed zone 402 may also have a zone footer 412, which comprise a data structure that may, among other things, specify which volumelets are present on the zone. The zone footer 412 may be written at the end of the zone when it is closed and provides an indication that the zone is closed. However, in some cases the closed zone 402 may not have a zone footer 412, such as in a case where writing the zone footer 412 was interrupted, such as may happen in the event of a power failure or hardware crash. However, a closed zone 402 that has no more room to write data is still closed even if the closed zone 402 lacks a zone footer. In such a case, the zone may be determined to be closed in several, including locating the write pointer of the zone and determining from the position of the write pointer that no further data may be written to the zone, reading a checkpoint that indicates that the zone is closed, reading an index or index page that indicates that the zone is closed, or reading the whole zone and determining that the zone is full.

As noted, each zone, once closed, may have a zone footer 412 that includes a summary of which volumelets have data present within the zone. The zone footer 412 information may be used to reduce data read during zone cleaning; i.e., the zone footer 412 may be read to determine whether the closed zone 402 contains any live data, and any zones containing data for only deleted volumelets may be skipped during zone cleaning when copying. Likewise, when performing a scrub, the zone footer 412 may provide information about data within the closed zone 402 such that the entire zone need not be read. Conversely, when relocating data associated with a specific volumelet, the zone footer 412 may provide a quick reference for whether the closed zone 402 contains data for the specific volumelet.

The zone footer 412 may be efficiently represented as a bitmask per extent when the closed zone 402 contains data for a small subset of volumelets. For example, if there are less than 16 volumelets in the zone, each of the volumelets may be assigned an index from zero to 15. Then for a certain extent, for example a one megabyte extent, for example, a 16-bit bitmask may be applied; i.e., each bit in the bitmask may be either a zero or one depending on whether there is any data in the one megabyte extent for that particular volumelet.

The zone footer 412 may be written to the end of the open zone 404 when the open zone 404 is closed, and may contain a summary of which volumelets have data entries within the zone. The information contained within a zone footer 412 may be used to reduce data read during zone cleaning; that is, the zone cleaner may skip any extents that contain data for only deleted volumelets. The zone may be represented as a bitmask per extent when the zone contains data for a small subset of volumelets. In some cases, where zones have data from many volumelets, writing the zone footer 412 may be omitted to force zone cleaning to read the entire zone. On a cold start, zones may be closed when a zone footer 412 is identified. In some cases, if a zone footer 412 cannot be written, a zone may be closed by writing a new checkpoint with the zone marked as closed. In such cases, the zone itself would not contain any record of its closure.

Drives supported by the multi-active zone file system may have host vendor specific self-monitoring, analysis and reporting technology (SMART) logs, one or more randomly writable zones, or both. Within the SMART logs or randomly writable zones may be disk header containing a universally unique identifier for the disk, an instance identifier, format version metadata, and a pointer to the most-recent checkpoint or the checkpoint itself. In some examples, a "host vendor specific SMART logs" may be a set of small (e.g., 256 kilobyte) segments outside of the normal disk address space that can contain arbitrary application-defined data. These SMART logs may be written atomically without any sequential storage concerns, so they may be used for storing a pointer to the checkpoint. If the SMART logs are used for checkpoint storage, two SMART log may be used to store copies of the disk header, and an additional two SMART logs may be used to store two pointers to the latest checkpoint stored in a sequential zone.

If random-write space is available, it may be used for checkpoint storage. In some examples, a "checkpoint" may be a periodic snapshot of the file system state sufficient to recover the file system state after a crash, including the root nodes of the data object index tree and a summary of the zones. For example, sections of the random-write space may be apportioned for two copies of each of the current and previous checkpoint. In some cases, a pointer to the most recent checkpoint may be stored in SMART logs, as this may allow the disk metadata to be located quickly by referencing the SMART log, after which the disk metadata may direct the system to use random-write space for checkpoint storage.

A checkpoint may contain the state of the file system, or pointers to the state of the file system, for recovering the file system from a particular point in time. Notably, a checkpoint may include a sequence number for the checkpoint, a list of open zones and a write pointer within these zones at the time of the checkpoint (the checkpoint may reflect all changes before that point and no changes after that point), a zone summary table, a table of volumelets, their metadata, and a root node of their index tree (e.g., a B+ tree), and a checksum over the checkpoint for verifying whether the checkpoint is complete. An example of a checkpoint may be seen in FIG. 6.

Figure 5:
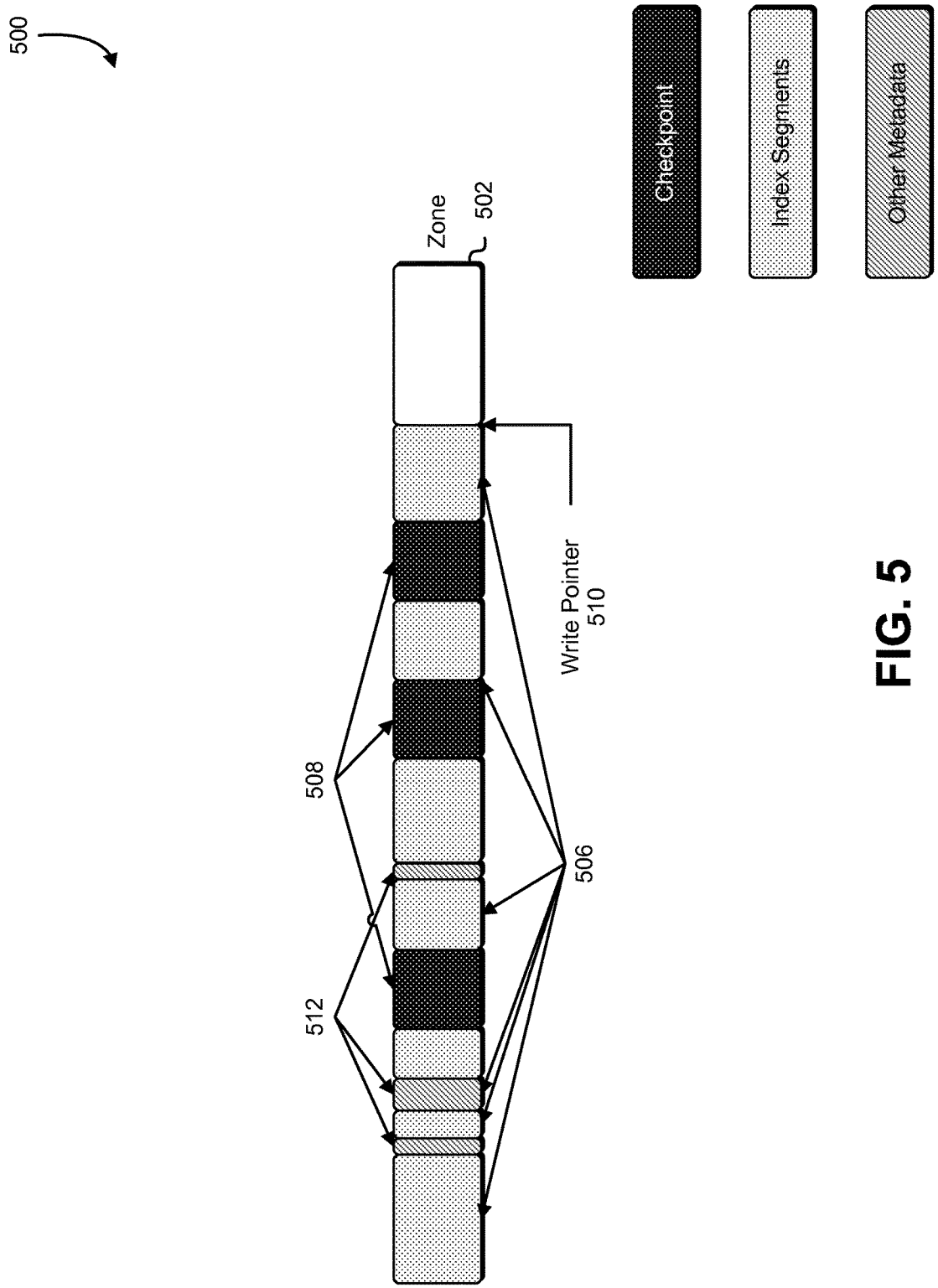
FIG. 5 illustrates an example of zones reserved for a metadata plane in accordance with an embodiment.

Checkpoints may be used to reduce the time needed to recover from a file system restart and may be written regularly by the file system. The most-recent checkpoint may be used during recovery, and log heads may be replayed from the point of the last checkpoint to recover system state to the time of the crash. FIG. 5 illustrates an example 500 of generating a checkpoint according to an embodiment of the present disclosure. Specifically, FIG. 5 depicts an example of an active metadata zone 502. The active metadata zone 502 illustrated in FIG. 5 may be comprised of various metadata, including segments (sets) of index pages 506 of an index. Periodically, on demand, or in response to a certain event trigger, checkpoints may have been generated and stored in the metadata zone. Other metadata 512 may also reside on the metadata zone; examples of other metadata include transient data, such as records of delete requests, put requests, drop volumelet requests, create volumelet requests, and update volumelet metadata records. As would be expected, delete requests may be requests to delete data objects, put requests may be requests to write one or more data objects to a zone, create voluemelet may be a request to create a volumelet on a zone, drop volumelet requests may be requests to remove a volumelet from a zone, and update volumelet metadata records may record updates to metadata concerning a volumelet.

Checkpoints 508 represent previous checkpoints. As a checkpoint is generated, it may be written to the metadata zone at the location of the current write pointer 510. Thereafter, other metadata may be written to the metadata zone after the checkpoint, and so on. Thus, in a metadata zone, checkpoints may be interspersed between other metadata. However, please note that, for recovery of the file system, only the most recent checkpoint may be needed.

In some cases, however, checkpoints may be differential; that is, rather than write a complete record of the state of the file system each time, each checkpoint may only reflect difference is the file system state from the previous checkpoints. In some cases, full checkpoints may be generated periodically (e.g., once per week) and differential checkpoints may be generated between the full checkpoints; in this manner, a balance between performance and minimizing space taken up by checkpoints may be achieved. Note also that, in some embodiments there may be at least two metadata zones—with at least one of the metadata zones in active mode and containing a sufficient metadata to reconstruct the file system to the state of the most-recent checkpoint. In such an embodiment, as the active metadata zone approaches maximum capacity, the an alternate metadata zone may be activated for storage of the next checkpoint and other metadata. The previous active metadata zone may then be erased and/or placed in standby mode as needed.

Note that in some embodiments, there may not be identifiable metadata zones, and metadata and regular data objects may be stored together on the same zones. In other embodiments, there metadata zones may be stored on zones reserved for metadata. Note too that referring to zones as "reserved" for metadata includes both embodiments where metadata zones are exclusively reserved for use by metadata as embodiments where metadata zones are zones that are biased in favor of metadata. For example, in such embodiments where metadata zones are biased for metadata, regular data objects may be stored on the metadata zone if no suitable data zone is available for storing the data objects. Likewise, in such zone bias embodiments, metadata may be stored on zones biased in favor of regular data objects in cases where the metadata zones do not have sufficient space for storing the metadata.

As noted, checkpoint may be stored in random-write space or in a sequential zone with a reference to the checkpoint stored in a SMART log, or other vendor specific log, page. This may allow the latest checkpoint to be quickly located by reading the checkpoints indicated by the log page and selecting the checkpoint with the highest sequence number. Note that, in some cases, when checkpoints are stored on sequential zones, they may be stored in zones primarily used for other transient data, such as delete records, index pages, and volumelet metadata updates. In other of these cases, the checkpoints may be stored in normal data zones.

Note that the root node of the index tree of the file system may be part of the checkpoint. That is, child zones may be written to the metadata zone in response to a memory commit or in preparation for being referenced by a checkpoint. Thus, index nodes written after the last checkpoint (i.e., unreferenced by that checkpoint) may be discarded in a cold start for replaying log records against the checkpoint.

The metadata zone 504 is an example of a zone in the middle of generating a checkpoint. All data mutation operations (writes, deletes, etc.) to the zone may be temporarily paused until the checkpoint is generated and written to the zone, thereby placing the zone into a standby mode for the duration. This ensures that the file system is in a static state at the time the checkpoint is generated, and this ensures that, during a replay process, changes to the file system are not inadvertently overlooked. When the checkpoint for the metadata zone 504 is generated, it may be written after the respective write pointer 510 for the zone, and operations to the zone may be resumed from standby.

Generating the checkpoint may be initiated by the checkpointer. The checkpointer may initiate the process by providing a message down a chain of record processors and then wait for each record processor to respond with snapshot data that may be incorporated into the checkpoint. Because messages along the record processor chain may be processed in order (due to the properties of actor concurrency), the snapshots may combine to form a consistent point-in-time view of the file system state. Once this consistent snapshot is obtained, another request may be sent to a log manager to flush all pending writes to disk. Once this is complete, the checkpoint may be written to an appropriate zone for checkpoint data.

Figure 6:
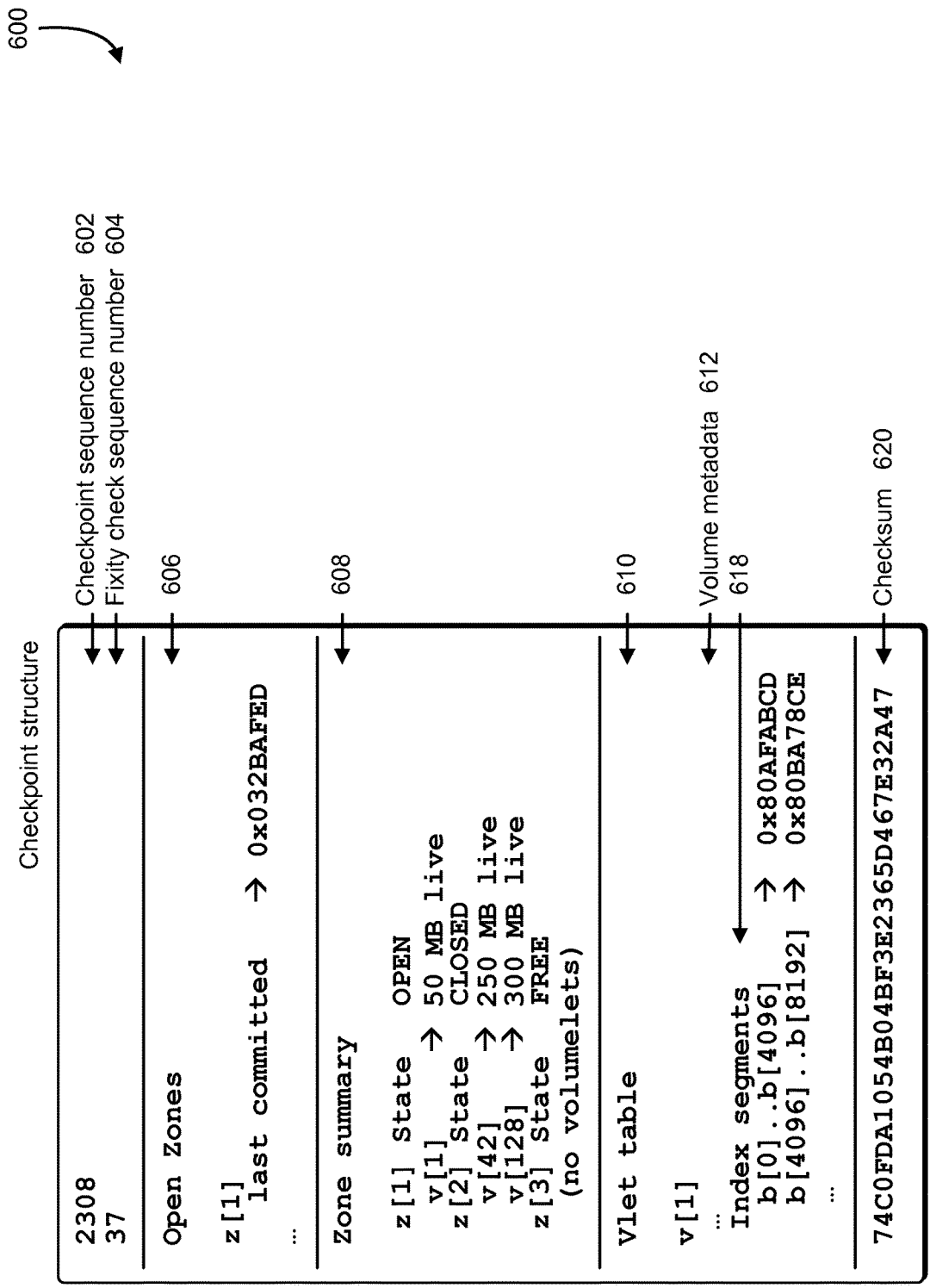
FIG. 6 illustrates an example of a checkpoint in accordance with an embodiment.

FIG. 6 illustrates an example of a checkpoint 600 in accordance with an embodiment of the present disclosure. As illustrated in FIG. 6, the checkpoint 600 may include a checkpoint sequence number 602, a fixity check (scrub) sequence number 604, a list of open zones 606 and when a checkpoint was last generated, a zone summary 608, a volumelet table 610, volume metadata 612 for each volume, a list of index segments 618 for the volume and their addresses, and a checksum 620 of the checkpoint.

The checkpoint sequence number 602 may be a number that is incremented each time a checkpoint is generated. In this way, the most recent checkpoint may be determined by finding the checkpoint having the highest sequence number. The scrub sequence number 604 is a number that may be incremented each time a fixity check is performed in the multi-active zone file system. Thus, the scrub sequence number 604 entry indicates the most recent fixity check as of the time that particular checkpoint 600 was generated.

The list of open zones 606 comprises a list of the active (i.e., non-empty, non-closed) zones and an offset for each respective zone indicating that all records before the offset are reflected in the checkpoint/commit. In some cases this offset may be the position of the write pointer for the zone as of the time the checkpoint was generated (e.g., the zone write pointer). In the checkpoint 600 illustrated in FIG. 6, when the checkpoint was generated, the write pointer of zone 1 was located at offset 0x032BAFED. The zone summary 608 includes a list of all of the zones and their respective states and a list of volumelets in each zone and how much space in the zone is being taken up by the respective volumelets. A zone summary table in a checkpoint may contain, for each log zone, the state of the log zone (e.g., closed, open, or empty), and, if the log zone is not empty, a map between volumelet identifiers and an amount of live data of the volumelet. In some examples, a "live data" may be data that is currently part of the logical state of the file system; i.e., data that has not yet been obsoleted by being copied elsewhere by zone cleaning or by deletion. For the checkpoint 600, zone 1 is open and has 50 megabytes allocated to data for volumelet 1, zone 2 is closed and hosts 250 megabytes of data for volumelet 42 and 300 megabytes of data for volumelet 128, and zone 3 is free and therefore contains no volumelet data. Using this information, a zone cleaning process may quickly identify zones that have deleted space available (e.g., fewest live volumelets) and/or which volumelets have data that may be relocated to free up the most space on zones.

The volumelet table 610 may be used to list and describe each of the volumelets. For example, the checkpoint 6 shows that the index segments 618 for data objects 0-4096 may be located at address 0x80AFABCD in the metadata zone. Likewise, the index segments 618 for data objects 4096-8192 may be found at address 0x80BA78CE. The volume metadata 612 may include various types of metadata such as a timestamp indicating when the volumelet was created, or other metadata. Finally, the checksum 620 of the checkpoint 620 may also be stored. The checkpoint 620 may be used to verify the integrity of the checkpoint. For example, if a subsequent generation of a checksum for the checkpoint 600 does not match the checksum 620 in the checkpoint, the checkpoint may be presumed to be corrupt or altered, and for a replay, the checkpoint having the sequence number prior to the checkpoint sequence number 602 may be used for the replay instead.

The multi-active zone file system may further include ordering of events. For some operations, order may not matter, but for other operations, such as in a case where a DELETE request for one zone is received immediately following a PUT request for another zone, the order in which to perform operations may need to be determined. For example, a PUT should occur before a DELETE of the PUT data is possible. Likewise, a CREATE_VOLUMELET should precede a PUT of data for the volumelet and a DELETE_VOLUMELET operation on the created volumelet, etc. It may be advantageous to record this order in case the file system needs to be replayed, such as may need to occur if the file system is restarted. When the file system is restarted, the file system needs to determine what it was doing before the restart; that is, where the correct locations are for the write pointers of all of the zones. Thus, sync pointers may be used for partial ordering to keep track of the event order across multiple zones by recording in a sync record what data and/or metadata operations came before the current operation.

In an alternate embodiment, in lieu of sync records/pointers, sequence numbers may be recorded with each data object instead. In such an embodiment, a replay may walk the sequence numbers of the data objects in order to find the current write pointer positions for each zone. As with sync pointers, the speed of the replay may be increased by restoring the state to the state of the most-recent generated checkpoint and starting the walk from this state.

For example, the system may keep track of the last operation that made certain types of changes to a volumelet, and keep track of the last operation to each individual data object that made certain types of changes, keep track of other recent operations performed on the volumelet. Then, based at least in part on those tracked operations, when certain types of changes to the volumelet are requested (i.e., delete, etc.), sync records may be added to the newest of each zone involved with any of the data objects of that volumelet. Likewise, when a data object operation is requested, a sync record may be added with the last operation for that particular data object as well as the last major operation for the volumelet. In some cases, it may be determined that such sync records may not be needed, for example, if the last operation occurred before the last checkpoint was generated.

Figure 7:
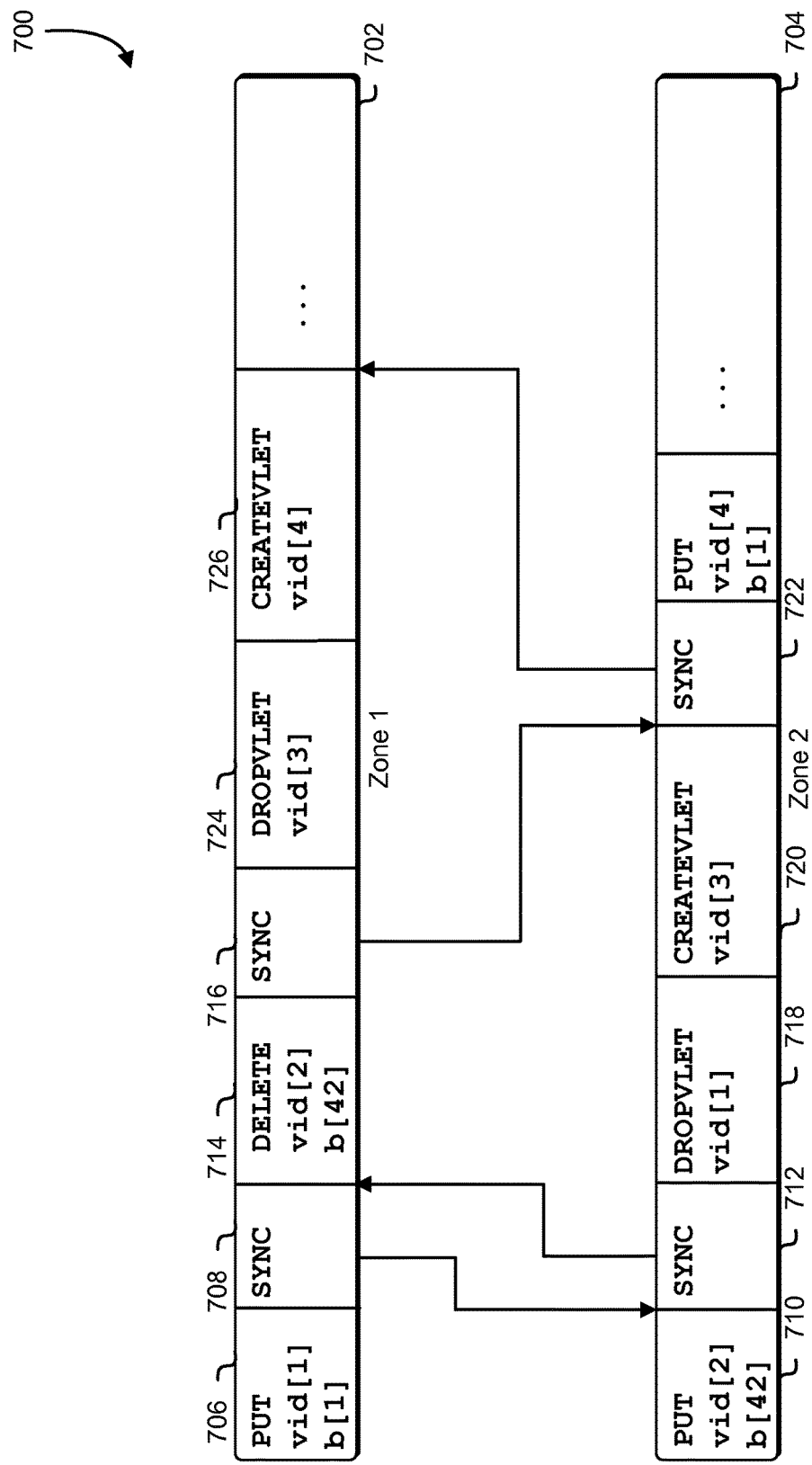
FIG. 7 illustrates an example of sync record usage in accordance with an embodiment.

FIG. 7 illustrates an example 700 of sync record usage of an embodiment of the present disclosure. Within each zone, data that was recorded before the last checkpoint (i.e., before the commit pointer was recorded in the checkpoint) may be considered committed data. Committed data may be located using pointers stored in the index in the metadata plane. Data recorded after the last checkpoint may be considered a partially ordered log. Because multiple zones may be simultaneously open for writing, if writes made to zones are interpreted in the wrong order, the state of the zone may be rendered inconsistent. Therefore, in order to resume successfully after a cold start, the correct ordering of records recorded after generation of a checkpoint must be determined.

In some cases, the order in which records are written may not matter. For example, the execution order of multiple PUT requests may not matter, as a PUT may not be allowed to overwrite another PUT without an intervening DELETE request. Likewise, the execution order of multiple DELETE requests may not matter, as long as idempotent DELETEs are not recorded in the log heads (an example of an idempotent DELETE being a DELETE of a record that has already been deleted). However, the order of PUTs and DELETEs of the same data object (including volumelet deletes) may be maintained in order to avoid putting the zone in an inconsistent state. Thus, records in open zones may be considered to be partially ordered. Sync records and ordering rules may be utilized to enforce ordering. For example, a sync record in one zone may indicate an ordering with respect to records that appear before an offset into another zone. As well, continuation records may act as an indication that a log continues on another zone.

A set of ordering rules may include ordering records in a zone in the order they appear on disk (i.e., the order in which they were written), ensuring that the first record of a zone is recorded following the continuation record that opened the zone. Recording sync records following the records appearing before the offset recorded in the sync record (and in the zone recorded in the sync record); i.e., recording sync records after the specific records to which they refer. Moreover, if the last successful checkpoint does not reflect a record, the record may be presumed to have happened after the checkpoint was written. Note that, for this last rule, an order may not be presumed for records written in concurrence with the checkpoint being written, which may reduce a need for sync records.

Sync records may be produced as needed to enforce ordering, such as for ordering execution of a PUT request followed by a DELETE request of the same data object without generating an intervening checkpoint. Otherwise, requests may be executed in the order in which they are presented to the file system. However, on a cold start, a log head may be selected arbitrarily for replay and, if a sync record referring to records not yet consumed, the replay may move on to the next log head. Then, as noted, once replay is completed, a full checkpoint may be generated and normal operation may be resumed.

The example 700 of FIG. 7 illustrates two zones, a first zone 702 and a second zone 704 and partial ordering by sync pointers. Note that FIG. 7 is presented for illustrative purposes only, and, in some cases, sync records may not be needed where intervening checkpoints are be present between DELETEs and PUTS and between volumelet manipulations and PUTs. Note that the zones of example 700 are illustrated in an embodiment where transient event ordering records may be stored on the data zone, however in other embodiments such event ordering records may alternatively be stored in a metadata zone. As noted, sync pointers may be used to replay events that have occurred since the most recent checkpoint was generated and the event that caused the replay process to commence. If the zones of example 700 were to be replayed, a zone may be selected arbitrarily, such as the first zone, and the first event, PUT event 706 may be read; the PUT event 706 causes data object 1 ("b[1]') for volumelet 1 ("vid[1]") to be written. The system performing the replay process, such as the replay process described in conjunction with the replay process 1100 of FIG. 11, thus may recognize that the write pointer of the first zone 702 must at least be at or past the end of the PUT event 706. The next record may be read, which the system may recognize as a sync record 708 indicating that the next operation in the event order was performed on the second zone 704.

Therefore, the system performing the replay process may then switch to the second zone 704, noting (or bookmarking) the position at which it left off in zone 702. Because the system performing the replay process may recognize that it has not yet read any records from the second zone 704, it may start reading records from the beginning of the zone (i.e., selecting the first record in the second zone 704 that it has not processed), in this case PUT event 710. The PUT event 710 causes data object 42 ("b[42]") for volumelet 2 ("vid[2]") to be written. As with the first zone 702, the system may then recognize that the write pointer for the second zone 704 must at least be at or past the end of the PUT event 710. The next record read in the second zone 704 would be sync record 712, which directs the system performing the replay process back to the first zone 702.

Thus, the system performing the replay process may switch back to the first zone 702, noting the position at which it left off in the second zone 704, and the system then may continue from where it left off reading the first zone 702 and read the next record. The next record indicates a DELETE event 714; the DELETE event 714 causes the data object 42 of volumelet 2 to be deleted. As may be seen, by using the sync records, the event that PUT the data for the volume can be replayed in the proper order as coming before the event that DELETEed the data. The system may then recognize that the write pointer for the first zone 702 must be at least at or past the end of the DELETE event 714. Next, the system may read sync record 716, which again directs the system to switch to the second zone. Note that, while the sync pointer 716 points to a location on the second zone 704 (at the end of the most recent event on the second zone 704) that occurred before the next event (DROPVLET event 724) on the first zone 702, the replay of the second zone 704 continues from where it last left off from replaying the second zone 704. Thus, system may next read the DROPVLET event 718, which causes the deletion of volumelet 1, followed by the CREATEVLET event 720 which creates volumelet 3 ("vid[3]"). After that, the system may read the sync record 722 which directs the system performing the replay process to again switch back to the first zone 702. The system may then recognize that the write pointer for the second zone 704 must be at least at or past the end of the CREATEVLET event 720.

Therefore, the system performing the replay process may switch back to the first zone 702, noting the position at which it left off in the second zone 704, and the system then may continue from where it left off reading the first zone 702 and read the next record, which this time indicates DROPVLET event 724 which drops (i.e., deletes) volumelet 3. Next, the system performing the replay process may read the CREATEVLET event 720, which creates volumelet 4 ("vid[4]"). The system may then recognize that the write pointer for the first zone 702 must be at least at or past the end of the CREATEVLET event 726. The replay process may continue in this way until the final event that occurred before the start of the replay is reached, at which point the write pointers for all zones should have been determined.

Selection of a log head may be made with a goal to reduce zone cleaning overhead generated by metadata operations that become obsolete immediately after generating a checkpoint. Log heads may also be selected with an aim to avoid creating mixed zones. In some examples, a "mixed zone" may be a zone that contains data from multiple volumelets or includes data records and metadata records. Log heads may also be selected in such a way as to minimize wasted space at the end of the log zones. For example, a selection scheme may be implemented that prioritizes log heads based on a best fit between the data object being written and available space. Another selection scheme may be to, prioritize log heads based on amount of available space in the zone to maximize the amount of contiguous space allocated to the data object. Another selection scheme may be to prioritize log heads based on a scheme configured to minimize mixed zones.

In some examples, a "dedicated zone" may be a zone that contains only data from one volumelet. In some examples, an "empty zone" may be a zone that has not yet been written to or may be a zone that only contains obsolete data. In some examples, a "metadata zone" may be a zone for tracking metadata operations, such as volumelet creates, volumelet deletes, metadata writes, and data object deletes.

An example heuristic for log head selection may be to first immediately close log heads in zones with obsolete data to ensure that the zone may be reclaimed as soon as a checkpoint is generated. Next, metadata operations may be directed to log heads that already have metadata operations, and, unless lack of available space becomes an issue, closing the log heads as they become full and opening new ones. However, if space availability becomes an issue, metadata operations may be configured to use the example heuristics for data writes.

An example heuristic for data writes may be to perform the following steps, stopping at the first step that yields a usable zone for writing. The first step may be to attempt to locate a mixed zone, with the goal being to fill and close the mixed zone as quickly as possible. If no mixed zone is located, the next step may be to determine whether a dedicated zone for the volumelet being written to exists, and, if located, to determine whether the data may be written to the dedicated zone of the volumelet. Next, if a zone has still not been located and a threshold for the number of active zones has not been reached, attempt to allocate a new zone. Otherwise, if any zones have less than a threshold number of bytes free for an early close (EARLY_CLOSE_THRESHOLD), attempt to close the least recently used EARLY_CLOSE_THRESHOLD zone may be closed and, if a threshold for the number of active zones has not been reached, attempt to allocate a new zone. If no zone has been located at this point, the next step may be to attempt to find a zone for the least recently used mixed zone that has enough space. If no mixed zone has enough space, the next step may be to attempt to locate a zone for the least recently used dedicated zone for any volumelet. Finally, if no suitable zone has been found at this point, an attempt may be made to close the least recently used zone and allocate a new log head.

Note that an EARLY_CLOSE_THRESHOLD may be used to limit the number of active (open) zones at one time. Having fewer active zones may aid in maximizing available space; for example, it may be a more efficient use of space to divide and distribute ten megabytes of data among two zones (i.e., five megabytes apiece) than to divide and distribute ten megabytes of data among ten zones (i.e., one megabyte apiece). Furthermore, because metadata for active zones may be in memory, having fewer active zones may reduce the memory footprint of the system. Thus, in situations where the system finds that many of the open zones have too little free space to accommodate requested PUT operations, the EARLY_CLOSE_THRESHOLD may provide a way to identify when mostly-full zones should be closed and when empty zones should be activated in their place.

In the multi-active zone file system, it may be advantageous to minimize the number of volumelets per zone, because the fewer the number of volumelets there are on a zone the more efficiently the data associated with the volumelets may be relocated from the zone. Mixed zones may require more copying during the relocation to reclaim free space and may additionally require additional index records to be zone cleaned or scrubbed, which, in turn, may result in additional disk seeks and/or memory usage). Thus, heuristics for determining placement of volumelets are also contemplated as being within the scope of this disclosure.

As noted, multiple zones' worth of space may be reserved to ensure space for log heads and as a buffer for zone cleaning. Thus, in some of these cases, smaller zone sizes may present better overall space efficiency than larger zone sizes. However, having more smaller zones rather than fewer larger zones may result in increased memory usage due to an increase in the size of a zone summary table in memory, may cause more disk seeks, and may cause higher overhead for shingled magnetic recording disks due to space lost to buffers between zones. Thus, it may be advantageous to choose a zone size that optimally balances zone size with overhead. For example, depending on the performance specifications of the drive, it may be that, for a five-terabyte drive, zones of one gigabyte in size having 0.1% overhead may be an ideal size.

Likewise, because disk seeks may negatively impact performance, buffering small writes in memory in order to write multiple small writes at once may further improve performance of the multi-active zone file system. As an example, depending on factors such as memory size, speed, and disk performance, it may be determined that utilizing a two megabyte memory buffer for writes sufficiently reduces seek time and achieves optimal performance. Note that native command queuing, for drives that support this protocol, may be further utilized to reduce write and read latency.

Zone cleaning and scrub performance may be further improved by using readahead to reduce latency of sequential read operations. For example, because, for both zone cleaning and scrubbing, which zone will be read at the start may be known, contents of the zone may be pre-fetched into memory before cleaning. An optimal amount of the zone to pre-fetch may depend on the performance characteristics of the hardware of the disk drive upon which the zone resides. To improve performance of the multi-active zone file system, index nodes may be cached in memory. However, if memory availability is constrained, arranging for data objects to be written in an approximately sorted order may minimize the size of the active set of index nodes and thereby aid in keeping memory usage to a minimum.

In order to protect against bit flips, bit rot, and software bugs, many elements described in the present disclosure may have checksums to verify their integrity. Furthermore, checksums may also be used to verify that data has been written to the correct part of the disk as well. Thus, there may be checksums of the disk header, the zone header (which may include a start offset value and a universally unique identifier of the file system), the zone footer (which may include an offset value for the start of the footer and the universally unique identifier of the file system), a checkpoint (which may include the universally unique identifier of the file system), and the data record (which may include an offset value of the start of the record and the universally unique identifier of the file system). Examples of algorithms that may be used to provide checksums in this context include SpookyHash and SHA-256.

Figure 8:
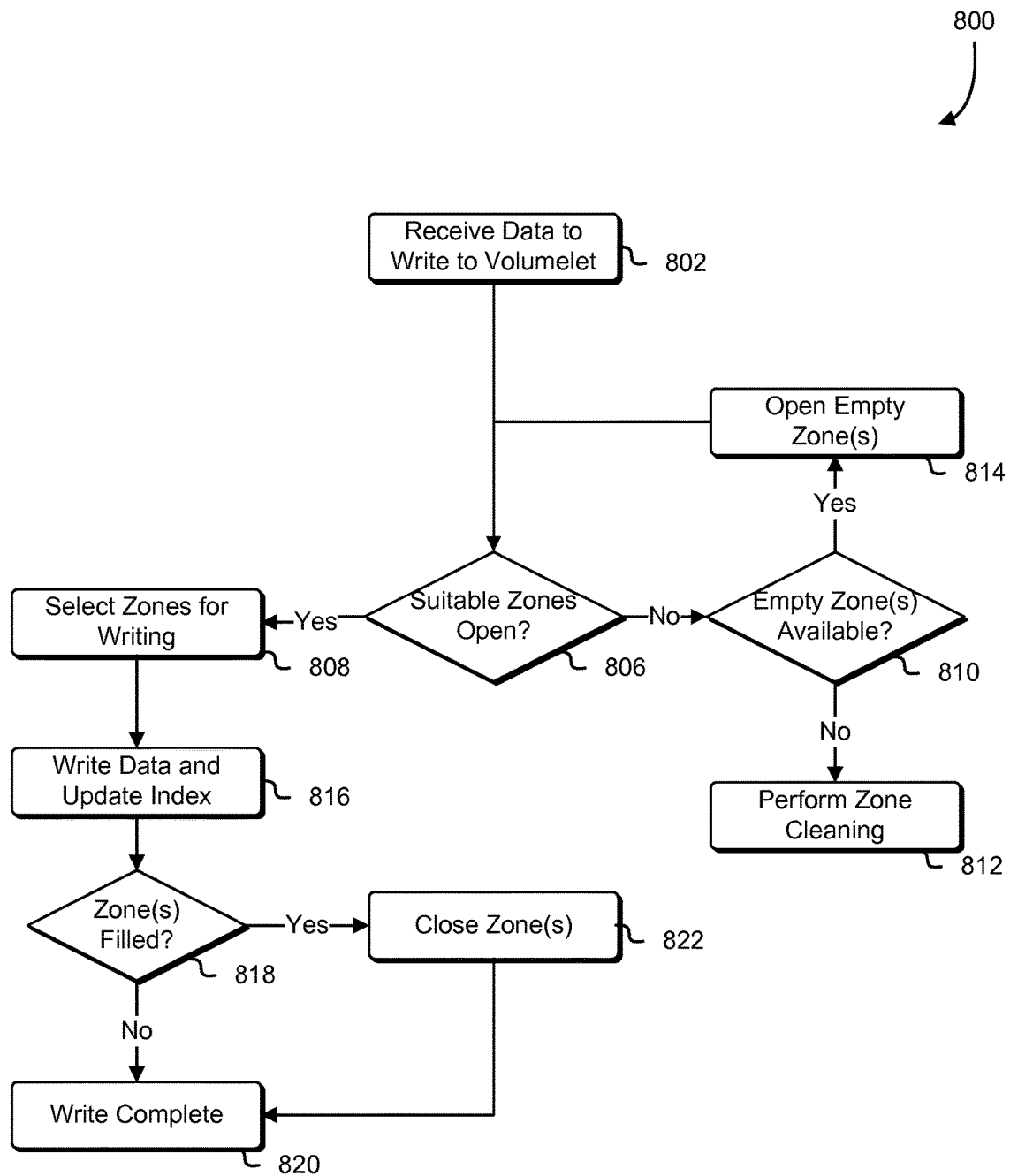
FIG. 8 is a flow chart that illustrates an example of writing a data object to a file system in accordance with an embodiment.

FIG. 8 is a flow chart illustrating an example of a process 800 for storing data on a multi-active zone file system in accordance with various embodiments. The process 800 may be performed by any suitable system such as a server in a data center, by multiple computing devices in a distributed system of a computing resource service provider, or any electronic client device such as the electronic client device 1202 described in conjunction with FIG. 12, in any suitable environment, such as the environment 200 of an archival data storage system of FIG. 2. The process 800 includes a series of operations wherein data is received and stored on one or more zones as needed.

In 802, the system performing the process 800 receives a data object and a PUT request to write the data object for a specified volumelet. The data object may comprise any known data type, including text data, bitmap, binary data, executable instructions, and database records. The data may be of any size, although if the size of the data is greater than the hardware of the computer system or systems can support, the system may respond with an error message and the data may not be written. A typical use case may be that the data is data to be archived with an archival data storage service using the multi-zone file system of the present disclosure.

Then, in 806, a determination may be made whether a sufficient number of active (i.e., open) zones are available for storing the data. As noted in FIG. 4, zones may be of at least three different states: open, closed, and free. Closed zones have been fully written and may not be written to again until they are zone cleaned. Free zones are empty, but have not yet been opened for writing. Thus, if enough space is available on active zones for storing the data object, the system performing the process 800 may proceed to 808 whereupon the suitable active zones are selected for writing.

However, even enough space is available on active zones, in some cases it may be preferable to open one or more new zones for writing; for example, if the available space comprises small blocks of space distributed over several zones, it may be preferable to open at least one new empty zone to minimize the number of mixed data zones (i.e., number of volumelets sharing zones) and decrease the fragmentation of volumelet data among zones. Note that heuristics for selecting the most suitable active zones may be used; some examples of heuristics may include an algorithm to determine which active zones have a best fit of empty space to the size of the data objects, an algorithm that selects active zones with the most free space, and an algorithm that selects active zones within a threshold of being filled and closed. As an example, in a case where there is an active zone with data belonging to "Volumelet X" residing on it and a request is received to write data for "Volumelet Y," a heuristic may determine that, rather than mixing data from Volumelet X and Volumelet Y on the same zone, an empty zone should be opened for storing the data for Volumelet Y. If not enough empty zones are available, the heuristic may determine whether either to mix the volumelet data on the active zone or to perform zone cleaning to free some empty zones.

Otherwise, if not enough suitable active zones can be located, the system performing the process 800 may proceed to 810, whereupon the system determines whether any empty (i.e., free) zones exist that may be suitable for storage of the data object. If no empty zones are available, the file system may have become too full to store the data object. In some cases, the lack of a sufficient number of active and empty zones may cause the system to respond to the requestor with an error notice that the file system is full. However, as noted, the multi-active zone file system may be a sequential file system, meaning that data may only be written to a zone sequentially, even though large amounts of data may have been deleted in regions before the current write pointer of the zone; therefore, in other cases, as depicted in FIG. 8, the lack of enough suitable active and empty zones may trigger the system to perform a zone cleaning process in 812, such as process 900 of FIG. 9, to free up zones that may have large amounts of deleted space. While the zones are being cleaned, the data object may be temporarily staged and, once one or more zones have been zone cleaned, the process 800 may retrieve the data object from the staging area and may return to 802.

Otherwise, if at least one suitable empty zone was located, in 814, a zone header may be written to the empty zone, a write pointer may be initialized to a log head of the empty zone, and the status of the empty zone may be changed to open and active. Then, the system performing the process 800 may return to 806 to determine whether enough suitable zones are now available for writing the data objects. In 816, the data for the volumelet may be written to the selected open zones, and an index page for the data may be updated to reflect the location and liveness status of the data. As the volumelet and data may be distributed among multiple zones, a continuation record may be written after each data object to indicate that the data is continued on another zone.

In 818, it is determined whether any of the zone that were written to are full. If all of the respective zones still have available space after the data has been written to the zone, the PUT request is complete and the system performing the process 800 may proceed to 820, whereupon the process is ends and remaining space in the zones remain available for future PUT requests. However, if a data object is of a size that fills the available space in a zone, full zones may be closed in 822. Closing the zone may include writing a zone footer to the zone to indicate that the zone is closed and no further writes to that zone may be possible. Note that in many cases, the actual closing of the zone in 822 may be deferred until just before doing another write operation, rather than being immediately closed. Note also that one or more of the operations performed in 802-22 may be performed in various orders and combinations, including in parallel.

Storing metadata separately from data may reduce zone cleaning overhead. Because metadata may be mutated more frequently than data, such as due to deletes or due to being used as scratch data for a scrub process, segregating the metadata from regular data may allow the system to avoid copying regular data that doesn't change very much (i.e., "cold data") whenever the metadata needs to be updated or moved. In some examples, "obsolete metadata blocks" may be records, such as transient event ordering records, which may not be needed after a checkpoint is generated. Free space management, also referred to as zone cleaning, may affect the performance of a log-structured file system. Minimizing the number of volumelets per zone will reduce the amount of active data that needs to be copied during zone cleaning, because zones may be freed more easily if less volumelets data needs to be relocated. Additionally, grouping records for sets of index pages and checkpoints may increase efficiency for zone cleaning.

Over time, due to express delete commands, such as a customer of an archival data storage service requesting delete of one or more data objects, or migration of volumelets to other hosts, a zone may have unused space which may be unusable because the space is located in front of the zone write pointer. Proper free space management improves performance of log-structured file systems. Thus, as data objects are deleted from zones, free space management may reclaim deleted spaces and make it available for future writes. In a log-structured file system, the live data in a zone may be copied to a log head to reclaim the free space. However, in this case, because zones with a large proportion of live data to deleted space will require more writes to the log head, cleaning performance may be improved by a free space management scheme that favors selecting zones with larger proportions of deleted space to live data for cleaning.

Zone cleaning may be performed by selecting a zone having the least amount of live data, determining which records in the zone are live, copying all of the live records to the end of a log and updating a respective index, and then marking the zone as empty. The empty zone may be distinguished from an non-empty zone because the index of the empty zone will indicate that no data exists in the empty zone. However, in some cases the state (e.g., empty state) of the zone may be tracked in memory in a space index.

Zone cleaning may be triggered in various ways. For example, zone cleaning may be triggered when the number of free zones falls below a predetermined minimum level. As another example, zone cleaning may be triggered when a predetermined amount of free space is available to be reclaimed. As still another example, zone cleaning may be scheduled to run as a background task periodically or during periods of idle disk activity to reclaim available space. However, in some embodiments another drive may be used as a temporary staging area for zone cleaning. In cases where zone cleaning is triggered by a low number of free zones, two available zones may be reserved exclusively for use by the zone cleaner to ensure that the file system has sufficient space to copy records during the zone cleaning. That is, once the multi-active zone file system gets at or below two available free zones, writing of new data objects may be paused until additional zones are freed by zone cleaning. One of the two reserved zones may be used for data relocation and the other reserved zone may be available for any metadata updates—such as updates to index pages and/or checkpoints—that may be needed. When zone cleaning is triggered by a large amount of free space available for reclamation, the zone cleaning may provide efficiency because a relatively small amount of active data may need to be copied. Likewise, cleaning zones as a background task may provide efficiency because it may reduce contention for log heads.

When a majority of deleted space on a zone is caused by volumelets being migrated elsewhere, efficiency of the zone cleaning may be improved by combining a migration policy with a writing policy. Thus, a scheme which selects volumelets for migration specifically to optimize zone cleaning (e.g., which volumelet or volumelets may be migrated that will result in the greatest number of empty or mostly empty zones) may improve performance of a log-structured file system. For example, by identifying, as eligible, volumelets in zones which, if the data for the volumelets were migrated, would render the zone more amenable for cleaning, efficiency of zone cleaning may be improved, thereby providing improved file system performance overall by maximizing the number of clean (i.e., defragmented) zones. Hence, a goal of a heuristic for selecting volumelets suitable for migration may be to maximize an amount of available free space while keeping the input/output cost of freeing the space to a minimum.

An example heuristic for such volumelet selection may be to compute, for each zone:

$$S=I \div Z$$

Where S is a score representing an amount of input/output overhead relative to an amount of free space that would be gained, I represents a total input/output overhead needed for zone cleaning, and Z represents free space gained by zone cleaning activity. Note that the smaller the value of S, the more ideal the zone candidate may be. The value of Z may be computed using the formula:

$$Z=F+V$$

Where V represents the number of live bytes associated with the volumelet being evaluated and F represents the total non-live bytes in non-empty zones. However, in other embodiments of the present disclosure, F may represent the total non-live bytes system-wide. The value of I may be computed using the formula:

$$I=V+W+R$$

Where W represents the number of bytes that would need to be written in order to zone clean all reclaimable space and R represents the number of bytes that would need to be read to zone clean all reclaimable space. The respective formulas for calculate W and R may be computed by:

$$W=T-V$$

$$R=L+W$$

Where T represents the total live bytes owned by other volumelets system-wide, and L represents the number of live bytes belonging to other volumelets, in zones occupied by data of the volumelet being evaluated. Because the S score may be an indication of the number of input/output operations per second needed to recover space after migrating the volumelet, sorting the volumelets by the lowest S score may order the volumelets in the order of the best candidates for migration to optimize zone cleaning performance. Note that it may not always be possible to migrate the volumelet having the lowest S score. For example, a volumelet may belong to a volume that is already scheduled to be migrated; in which case the first non-scheduled volumelet with the lowest S score that can be migrated may be the best candidate for migration.

Figure 9:
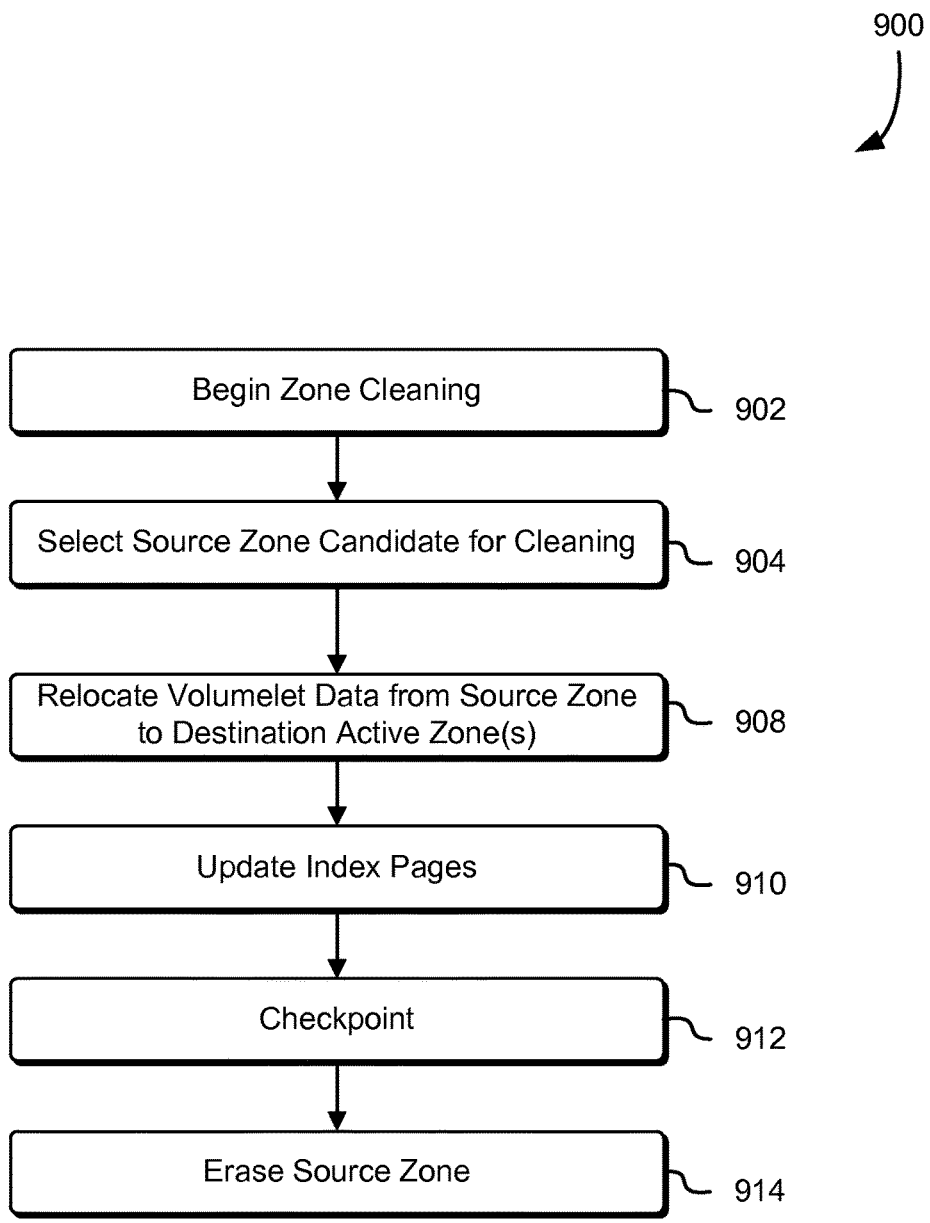
FIG. 9 is a block diagram that illustrates an example of zone cleaning in accordance with an embodiment.

FIG. 9 is a block diagram illustrating an example of a process 900 for zone cleaning in accordance with various embodiments. The process 900 may be performed by any suitable system such as a server in a data center, by multiple computing devices in a distributed system of a computing resource service provider, or any electronic client device such as the electronic client device 1202 described in conjunction with FIG. 12, in any suitable environment, such as the environment 200 of an archival data storage system of FIG. 2. The process 900 includes a series of operations wherein the zone cleaning process is started, a zone is selected for cleaning, the data is emptied from the zone.

In 902, the zone cleaning process begins. The zone cleaning process may be launched in response to a variety of events, including being scheduled to run periodically, triggered in response to a lack of enough available zones to store data, triggered in response to a number of empty zones decreasing below a threshold amount, executed in response to a request from a system administrator or other authorized user, or triggered in response to a number of deletions exceeding a certain threshold since the last zone cleaning. A goal of zone cleaning may effectively be to defragment deleted space in a zone such that large blocks of space of an append-only region or entire zones may be rendered available for writing.

Note that zone cleaning may require a certain amount of space, two free zones for example, to use as a buffer for copying records during the cleaning process. Therefore, the system may be configured to stop processing write operations if there are not enough free zones for zone cleaning. A shortage of free zones therefore may be another event to trigger the zone cleaning process; for example, if only two zones remain, write operations may be paused and zone cleaning may be executed to free up more zones so that writing may resume. In some cases, however, a separate drive may be used as a separate staging area for copying records during the cleaning process.

Note too that metadata zones (i.e., the zones containing such metadata as index pages, etc.) may also contain transient records for logging operation requests, such as requests to delete certain data objects, drop certain volumelets, create volumelets, etc. Because such transient records prior to checkpoint may not be needed after the checkpoint, these records before the checkpoint may also be zone cleaned. Likewise, because index entries may be obsolete over time, obsolete index entries may be zone cleaned as well.

In 904, candidates for cleaning may be identified. In some cases, a heuristic may be implemented that determines. However, in a case where deletions have built up in zones and/or where volumelet selection does not yield sufficiently promising candidates for volumelet migration, a heuristic may be implemented to select individual zones for cleaning. An example heuristic for selecting a zone suitable for zone cleaning may be to select a zone that does not contain live data (e.g., all formerly live data may have been deleted, migrated, or otherwise rendered obsolete) or selecting the zone having the greatest amount of non-live space (i.e., less non-obsolete data; i.e., space that had been allocated to data but has since been deleted, moved elsewhere, corrupted, or may be otherwise unusable). This non-live space may be determined from the most-recent checkpoint, since the checkpoint contains a summary of all zones and how much space is used within each zone on a per-volumelet basis. Alternatively, the zone having the greatest amount of non-live space may be determined from a space index, which is an index that may be used to track the live space in each zone. When a volume is deleted, the associated volumelet entries are removed from the indexes and the next checkpoint may no longer contain any reference to the deleted volumelet. In some cases, any references to the deleted volumelet may be removed from the most-recent checkpoint without re-generating the entire checkpoint. Likewise, if a DELETE is executed, the deleted space may be removed from the zone entry in the index and/or checkpoint.

In an embodiment, free space may be estimated by adding all free space in all log zones and deducting for three zones of space. Three zones of space may be deducted in order to reserve two zones for zone cleaning and reserving a third zone for ensuring space for zone cleaning to complete so that three zones can be reserved again; that is, the third zone may provide an additional buffer in case the two reserved zones become filled while zone cleaning is being performed. In some cases, additional zones of space may be deducted from the free space estimation in order to reserve enough space for the maximum number of data log heads. In these cases, the minimum overhead may be calculated as:

(3+#data log heads)×zone size

At an expense of losing some capacity, zone cleaning activity may be further streamlined by counting zones above a threshold amount of utilization as being completely full. The free space estimation heuristic may be further modified by reserving space for volumelets to ensure that storage does not become overextended. To achieve this goal, we may record how much data we expect to allocate to the volumelet (e.g., 24 gigabytes), and subtract (reserve) this amount from the available free space. As data for the volumelet is written, the size of the data may be deducted from the reservation.

Once the zone with the least amount of used space (i.e., live data) is identified, in 908, the data objects being cleaned may be relocated (i.e., moved) from the source zone to the one or more destination zones. In some embodiments, the data objects from the zone being cleaned may be relocated by submitting the data to be written in the same way as if they were new data objects, and updating the index pages to reflect the new locations of the data objects. In this manner, the normal heuristics for data objects may be utilized to determine appropriate destination zones for the data objects. Note, that heuristics may be applied to select zones for the data based on minimizing the number of different volumelets sharing the same zone for data.

Note that in some cases a zone footer may contain a summary detailing which volumelets have data objects present in fixed size extents (such as one megabyte) of the zone.

Knowledge of which volumelets have data within the zone may be useful in improving the performance of the zone cleaning. For example, the zone cleaner may examine the zone footer and determine that a portion of the zone contains data for a volumelet that is no longer active (e.g., the volumelet may have been migrated or dropped), and the zone cleaner may thereby avoid reading that data.

After the data objects have been relocated from the zone, the index pages may be updated in 910 to reflect the new locations of the volumelet data objects. Note, that index pages may be updated in parallel with the relocation of each data object. In some embodiments, such as the operations of 912 in the embodiment of the process 900, a checkpoint may be generated after the relocation of the data objects and the update of the index pages, to reflect a state of the system that includes the new locations of the relocated data and to ensure that the old locations do not get replayed (i.e., because the bits that have been written to the zone are not automatically or immediately overwritten, a replay of the zone without the checkpoint may cause the system to misinterpret the bits as live data when they are actually old, obsoleted data, also referred to as "dangling data"). Finally, in 914, the source zone may be erased, which, in the case of a zone on an append-only region of media, may simply involve setting the write pointer/log head to the beginning of the zone. Note that one or more of the operations performed in 900-16 may be performed in various orders and combinations, including in parallel.

Zone cleaning may not necessarily visit all zones; i.e., zone cleaning may ignore zones containing long-lived data. For this reason, a periodic sweep (e.g., examination) of the disk, referred to as a "scrub" or "fixity check," may be performed to verify the integrity of the file system structure on zones that otherwise may not be visited by the zone cleaning process. This scrub may include verifying checksums on all data records, checking for dangling pointers to sets of index pages, checking for dangling pointers from sets of index pages to data records, and identifying orphaned data records and inconsistent live data.

A scrub sequence number may be defined and stored in a checkpoint, and, at the start of the scrub, the scrub sequence number may be incremented. Each set of index pages may be stored with a scrub sequence number indicating the last scrub performed for that index, and, for each reference to a data record in the index, a flag or bit, referred to as the "checked bit," indicating whether the data record was found to be present and healthy at the time of the cited scrub may also be stored.

When an index page is modified, if it has a scrub sequence number not equal to the current scrub sequence number, all of the checked bits may be cleared and the scrub sequence number of the index page may be updated to the current scrub sequence number. When a record concerning the record is written, the corresponding checked bit in the index record may be set to TRUE to ensure that the record will not be considered missing even if the current scrub has already been performed on the zone containing the record.

The scrub process may examine (or walk) all log zones on a disk. If the scrub finds a record, it may perform a checksum on the record and then check the record against its index; if the checksum does not match the checksum recorded in its index, the record may be presumed to be corrupted. If the record is live (i.e., referenced by the index), the corresponding checked bit may be set. When the scrub finishes examining a zone, the liveness data of the zone may be updated, and any changes to the liveness of the data that occurred concurrent with the scrub may also be reflected in the update. The scrub process may also log and/or send a notification or raise an alert if consistencies are found or fixed during the scrub process.

The final operations of the scrub may involve examining (or walking) the index for unset checked bit and index numbers having non-current scrub sequence numbers. If unset checked bits and non-current scrub sequence numbers, the record associated with these checked bits/sequence numbers may be presumed to be corrupt or invalid and may be deleted (e.g., by requesting a DELETE of the record) in order to bring the file system into a consistent state.

Figure 10:
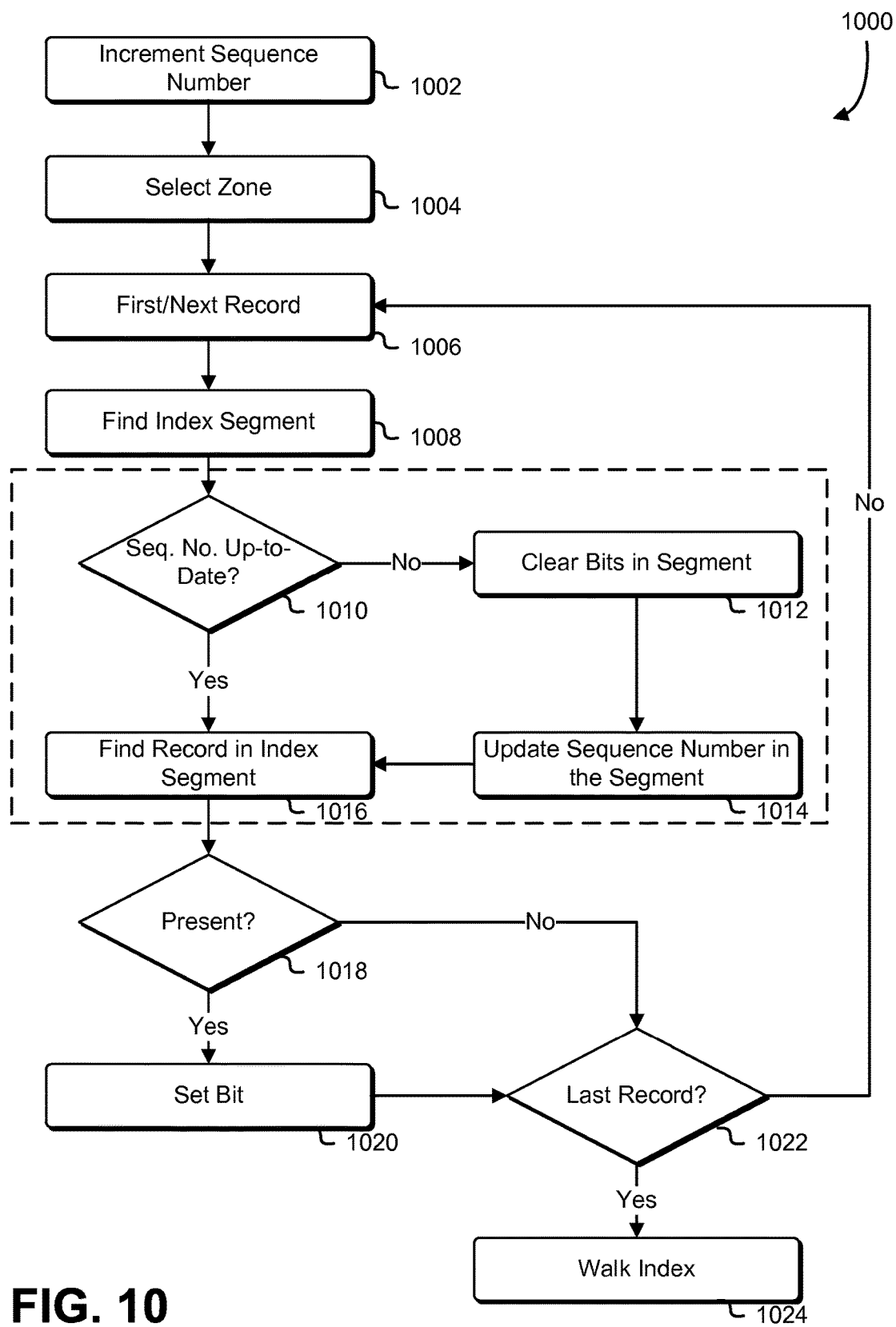
FIG. 10 is a flow chart that illustrates an example of scrubbing in accordance with an embodiment.

FIG. 10 is a flow chart illustrating an example of a scrub process 1000 for a multi-active zone file system in accordance with various embodiments. The process 1000 may be performed by any suitable system such as a server in a data center, by multiple computing devices in a distributed system of a computing resource service provider, or any electronic client device such as the electronic client device 1202 described in conjunction with FIG. 12, in any suitable environment, such as the environment 200 of an archival data storage system of FIG. 2. The process 1000 includes a series of operations wherein, for a specified zone, records are read and the system determines whether the records are in the index and, if they are, notes them as found. At the end, if any records were not found, they may be deleted from the index and, in some cases, a recovery operation may be performed to recover the lost record, if needed.

In 1002, the scrub sequence number may be incremented, or, if it is the first scrub being performed on the multi-active zone file system, a new scrub sequence number may be generated. As noted, the scrub sequence number may be used to determine the last time a particular record was confirmed to have been present on a zone. Note that, if a PUT operation occurs while performing the scrub process and an existing index page having a non-current sequence number is accessed, a field, referred to as a "found bit," of the index page may be set to "found" and the sequence number updated. In many cases, any access (e.g., PUT, GET, etc.) to an existing index page may cause found bits of the index page to be set to found.

In 1004, the system performing the scrub process 1000 may select a zone for scrubbing. Note that all zones in the multi-active zone file system may be scrubbed during the scrub process, in which case the operations of 1002-24 may be performed for each non-empty (i.e., not free) zone in the multi-active zone file system. Alternatively, the scrub process may be performed only on specified zones.

In 1006, the records of the zone may be read, starting at the beginning of the zone to locate the first (or next) record in the zone. Upon locating the record, system performing the scrub process 1000 may read the record and compute a checksum for the record. Then in 1008, the system performing the process 1000 locates the relevant index segments for the record and proceeds to 1010.

In 1010, the system determines whether the found index segment's sequence number is up-to-date (i.e., matches the current incremented sequence number generated in the operations of 1002). If not, in 1012 the found bits in the found index segment may be cleared (i.e., set as "not found") and, in 1014, the sequence number of the index segment may be updated to the current sequence number. Note that writing of data objects to zones need not be paused/halted during the scrub process, and any data objects that are written during the scrub process may have found bits set (i.e., as "found") and the scrub sequence number set to the current scrub sequence number in the corresponding index entries for the newly-written data objects.

Then, if the index segment's sequence number was determined in 1010 to be up-to-date or after updating the index segment's sequence number in 1014, in 1016 the system performing the process 1000 attempts to find the particular record in the index segment. In 1018, if the record was not found in the index segment, the system performing the process 1000 proceeds to 1022. Otherwise, if the record was found in the index segment, the found bit for the record is set (i.e., to indicated that the record was "found"), before proceeding to 1022. In 1022, the system performing the scrub process 1000 determines whether the last record in the zone has been read; e.g., if the system has read to the end of the zone. If the last read record is not the last record in the zone, the system performing the process 1000 may return to 1006 to read the next record in the zone. Note also, that if the last record for the current zone has been read but additional zones are yet to be scrubbed, the system performing the process may return to 1004 to select the next zone for scrubbing.

Note that the dashed lines indicate that operations 1010-16 steps may be additionally performed whenever an index segment is accessed (e.g., as part of a PUT operation, GET operation, etc.), and not just during the scrub process 1000.

Otherwise, in 1024, the system performing the scrub process 1000 may begin the phase of the scrub that walks the index. In 1024, the first index pages of the walk may be read, and a check of the scrub sequence numbers in the index segments is made. If the scrub sequence number in an index segment does not match the scrub sequence number generated in 1002, it may indicate that the records referred to in the index page are lost, corrupt, or otherwise unaccounted for or unusable. In such a case, the found bits of the out-of-sequence index segments may be cleared (i.e., set to "not found"), indicating that the records referred to were not found in the scrub. Once all the index segments have been walked in this manner, all records for the zones to be scrubbed should have been read and checked against their respective entries in the index pages. Then, any entry in the index segments referring to a record that was not found in the scrub process 1000 (e.g., entries with the found bit still set to "not found") may be deleted from the index pages. The space index may additionally be updated to reflect that the zones associated with the records that were not found may have additional free space in an amount corresponding to the size of the records that were not found.

Note that here a determination may be made whether any of the not-found records are missing redundancy encoded shards of data. In such a case, the operations of 1024 may include recovering the missing shard using the redundant encoded data of the other shards of the data, restoring the missing shard on an available zone, and recreating an index page entry for the newly-restored shard record. Note also that one or more of the operations performed in 1002-24 may be performed in various orders and combinations, including in parallel.

Log-structured file systems, including the multi-active zone file system, may use checkpointing and log-head replaying to reconstruct the system state on a cold start, such as after a crash. The checkpoints may be used as a starting point for the replay to avoid having to read/replay the entire disk on a cold start. Note too that the checkpoint may be recorded in a predetermined location, such as on a metadata zone, allowing the checkpoint to be quickly located and used to restore the file system to the state it was in at the time the checkpoint was generated, thereby accelerating file system restoration. For example, a checkpoint may be recorded periodically to a metadata zone when the file system is in a consistent state. The checkpoint may contain data on the current log heads, a summary of zones, a summary of volumelets, as well as any other data useful to re-initialize in-memory data structures. Once the state of the file system is restored to the state at the time the checkpoint was generated (i.e., a first state), log-head replaying of operations that may have occurred in the intervening time between checkpoint generation and the cold start may be utilized to restore the file system to the state it was in immediately prior to the cold start (i.e., a second state). In some examples, a "log-head replaying" may be a process of tracing the operations performed in the file structure from the state recorded by in most-recent, valid checkpoint to the state the file system was in immediately before the cold start.

Log-head replaying may be aided by ordering events using sync records, which may be used to infer the ordering of records that occur after generation of the checkpoint during cold starts. For example, after a cold start, the most-recent valid checkpoint may be located. When found, the log may be replayed based on the log heads and write pointers specified in the checkpoint. If, as each of the replayed log heads is read and, a sync record is discovered whose ordering constraint is not satisfied, the replay may move on to the next log head. Once replay is completed, a full checkpoint may be generated and normal operation may be resumed.

Figure 11:
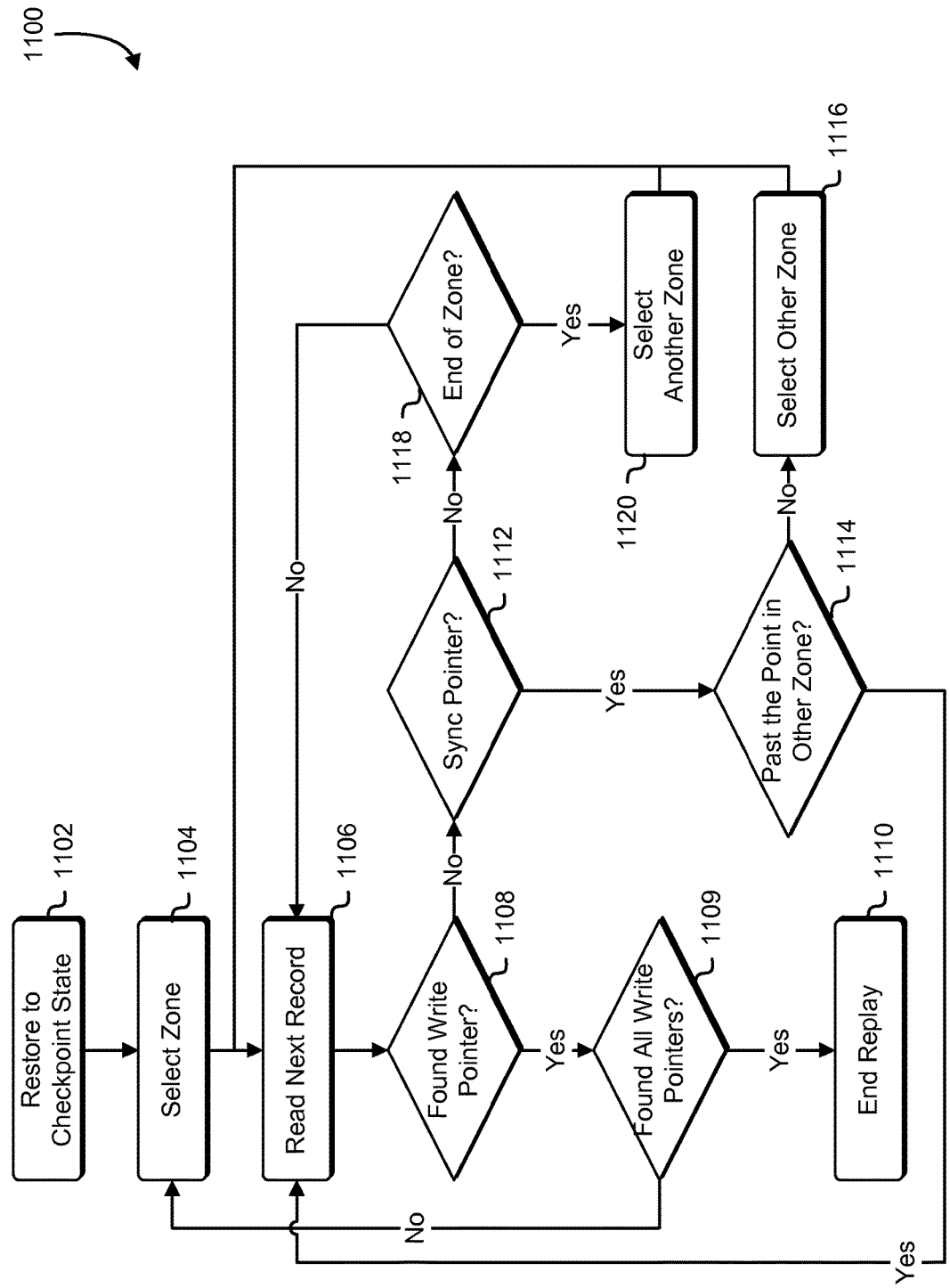
FIG. 11 is a flow chart that illustrates an example of replaying a file system in accordance with an embodiment.

FIG. 11 is a flow chart illustrating an example of a replay process 1100 for a cold start in accordance with various embodiments. The replay process 1100 may be performed by any suitable system such as a server in a data center, by multiple computing devices in a distributed system of a computing resource service provider, or any electronic client device such as the electronic client device 1202 described in conjunction with FIG. 12, in any suitable environment, such as the environment 200 of an archival data storage system of FIG. 2. The replay process 1100 includes a series of operations wherein, after reading the most current checkpoint for the multi-active zone file system, an arbitrary zone may be selected and the operations referred to by sync pointers may be traced until the last operation before the cold start is located.

In 1102, the replay process 1100 begins after being triggered by a certain event. Events that may trigger the replay process 1100 include power outages, hardware failures, and manual restarts. Although not required, the restoration of the multi-active zone file system may be accelerated by first restoring the file system to the state it was in at the most-recent, valid checkpoint (further details about checkpoints may be found in the description of the checkpoint 600 of FIG. 6). From there, in 1104, an arbitrary open or closed zone of the multi-active zone file system may be selected. Once selected, the commit pointer for the zone, such as may be found in the list of open zones 606 of the checkpoint 600 may be located.

Then, in 1106, the next zone record after the commit pointer found in 1104 may be read, or, alternatively if the commit record for the zone was not obtained, the first record of the zone may be read. If no record is found, it may indicate that no other operations were performed between generation of the last checkpoint and the event that triggered the replay process, or it may be that all live records for the zone have been read. In the former case, it may be determined that the current position of the write pointer of the zone is the same as the commit pointer. In the latter case, it may be determined that the current position of the write pointer is at the end of the last-read record of the zone. In either case, in 1108, it may be determined that the last write pointer for the zone has been found and the system performing the process 1100 may proceed directly to 1109 where it is determined whether the system has found write pointers for all of the zones.

If write pointers still remain to be found for some zones, the system performing the process 1100 may return to 1104 to select a zone for which its write pointer has yet to be found. Otherwise, if all write pointers have been found, the system performing the process 1100 map proceed to 1110. In 1110, the state of the multi-active zone file system being restored to the state it was in prior to the event that triggered the replay process and the operations of the multi-active zone file system may be resumed and the replay process may terminate.

However, if another record is located, the index may be examined to locate the index page corresponding to the record. If an index page for the record could not be located, it may mean that the record is obsolete data and, in such a case the write pointer for the zone may be determined in 1108 to be the end of the last-read record of the zone and the system performing the process 1100 may return to 1120 to select a different zone. On the other hand, if the index page for the record is located, the record may be assumed to be live data and the system performing the replay process 1100 will know that the zone write pointer has at least advanced to a position at or beyond the end of the record.

In this case, in 1112, the system performing the process 1100 makes a determination whether the located record is a sync pointer indicating that the next event in the event order may be recorded in another zone. If the record is a sync pointer, in 1114, a determination is made whether the point in the event order replay has already passed the point of the operation of the other zone pointed to by the sync pointer. If the operation pointed to by the sync pointer has not already been replayed (i.e., passed), the system performing the process 1100 may switch to the other zone in 1116 and begin reading records starting at the location pointed to by the sync pointer. Otherwise, if the operation of the other zone has already been replayed, the sync record may be ignored and system performing the process 1100 may return to 1106 to read the next record after the sync pointer.

On the other hand, in 1118, if the system performing the process 1100 has reached the end of the zone (or a zone footer) without finding a position of an active write pointer, the system performing the process 1100 may switch to a different (as yet not-replayed) zone in 1120 and return to 1106 to begin the replay process 1100 again with the newly-selected zone. Note that one or more of the operations performed in 1100-20 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 12:
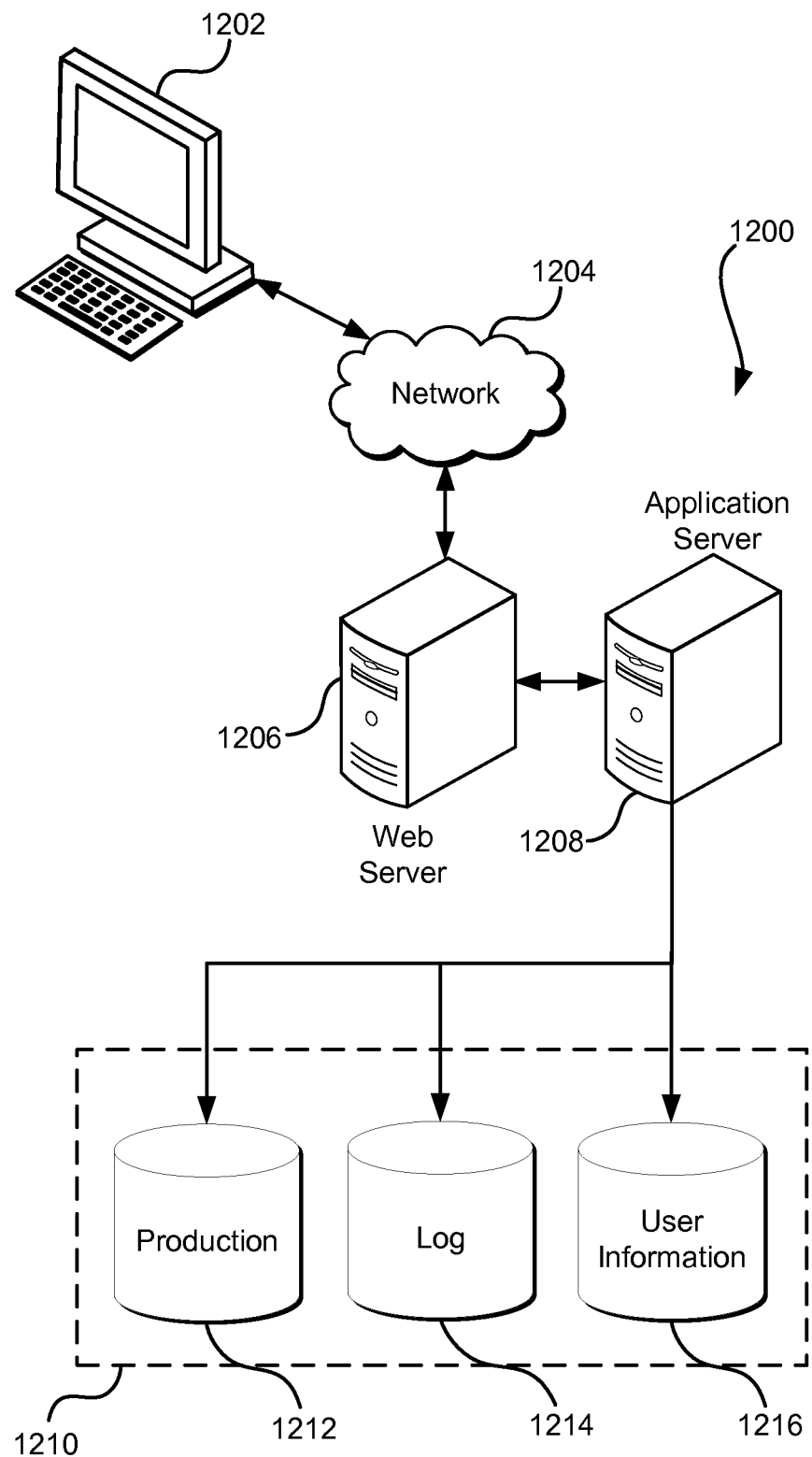
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. In some examples, servers may be implemented in various ways, such as hardware devices or virtual computer systems. In some contexts, a server may be a programming module being executed on a computer system. In some examples, "data store" may be any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   receiving data to write to a logical storage space of a log-structured file system, wherein the logical storage space spans a plurality of active zones, wherein the plurality of active zones are individual append-only sections of the log-structured file system, and each zone of the plurality of active zones has a write pointer indicating a last-write position within the zone;
   determining, from the plurality of active zones, a plurality of open zones having sufficient available space for storing the data;
   selecting, based at least in part on the data, a first open zone of the plurality of open zones;
   recording, to the first open zone, a sync record indicating an order of writing the data relative to a previous operation, the order including identification of a second open zone of the plurality of open zones; and
   writing the data to a subset of the plurality of open zones, the subset including at least the second open zone.

2. The computer-implemented method of claim 1, wherein writing the data to the plurality of open zones further comprises creating one or more index pages in the log-structured file system, wherein the index page indicates write locations of the data in the plurality of open zones.

3. The computer-implemented method of claim 1, wherein:
   the sync record is a member of a set of sync records recorded after a checkpoint, wherein the checkpoint comprises a snapshot sufficient to restore the log-structured file system to a first state; and
   the method further comprises:
      restoring the log-structured file system to a first state based at least in part on the checkpoint; and
      restoring the log-structured file system to a second state from the first state by tracing the order of writing the data indicated by the set of sync records.

4. The computer-implemented method of claim 1, further comprising:
   determining that a zone of the plurality of active zones is suitable for zone cleaning;
   relocating a set of data objects from the zone of the plurality of active zones to one or more different zones;
   updating one or more index pages corresponding to the set of data objects; and
   erasing the zone of the plurality of active zones by resetting a write pointer of the zone of the plurality of active zones.

5. The computer-implemented method of claim 1, further comprising:
   determining that a zone of the plurality of active zones is suitable for zone cleaning by referencing a space index that indicates that the zone of the plurality of active zones does not contain live data; and
   erasing the zone of the plurality of active zones by resetting a write pointer of the zone of the plurality of zones.

6. A system, comprising:
   one or more processors; and
   memory including instructions that, as a result of execution by the one or more processors, cause the system to:
      obtain a request to perform a data operation in a data storage management system configured to store data in one or more persistent sequential buffers;
      determine a plurality of zones sufficient for performing the data operation, wherein each zone of the plurality of zones is a persistent sequential buffer that has a write pointer indicating a last-write position within the zone;
      select, based at least in part on the data operation, a first zone of the plurality of zones;
      record, to the first zone, a sync record indicating at least a partial order of performing the data operation relative to performance of a previous data operation, the partial order including identification of a second zone of the plurality of zones; and
      perform the data operation in a subset of the plurality of zones, the subset including at least the second zone.

7. The system of claim 6, wherein the instructions that determine the plurality of zones sufficient for performing the data operation in the plurality of zones includes instructions that, when executed by the one or more processors, cause the system to:

determine the plurality of zones based at least in part on a state of the plurality of zones,
   wherein the state is selected from a set of possible state types that include an open state, a closed state, and a free state, and
   wherein the open state indicates a zone that is available for writing, the closed state indicates a zone that accepted write requests while in an open state but currently does not accept write requests, and the free state indicates a zone that contains no data and will not accept write requests until opened.

8. The system of claim 7, wherein the memory further includes instructions that, when executed by the one or more processors, cause the system to change a zone of the plurality of zones from the open state to the closed state by writing a footer to the zone, wherein the footer contains a summary of volumes that have data entries within the zone.

9. The system of claim 6, wherein the data operation is a read data operation, a write operation, a delete data operation, a create volume operation, update volume metadata operation, or a delete volume operation.

10. The system of claim 6, wherein at least one zone of the plurality of zones is configured to store metadata, wherein the metadata includes at least one of:
   one or more index pages for at least one data object in a zone of the plurality of zones;
   a checkpoint that, for each zone of the plurality of zones, indicates a location of the write pointer of the zone; and
   a transient record for logging the request to perform the data operation.

11. The system of claim 6, wherein the memory further includes instructions that, when executed by the one or more processors, cause the system to update an index page of an index to reflect that the data operation was performed in the plurality of zones, wherein the index is arranged in a tree structure with the index pages being nodes of the tree.

12. The system of claim 6, wherein the memory further includes instructions that, when executed by the one or more processors, cause the system to generate a checkpoint, wherein the checkpoint is a snapshot of a file system for the plurality of zones sufficient to recover a state of the file system, and the checkpoint includes one or more records indicating that the data operation was performed in the file system on the plurality of zones.

13. The system of claim 12, wherein the file system for the plurality of zones operates on at least one shingled magnetic recording drive with a self-monitoring, analysis and reporting technology log, and a pointer to a location of the checkpoint is stored in the self-monitoring, analysis and reporting technology log.

14. A non-transitory computer-readable storage medium having stored thereon executable instructions that, as a result of execution by one or more processors of a computer system, cause the computer system to:
   obtain a request to perform a data operation with a volume, wherein the volume is a logical storage space in which data objects may be stored;
   determine a plurality of zones for performing the data operation with the volume, wherein each zone of the plurality of zones comprises a series of sectors of a computer-readable storage medium that forms an append-only section of the computer-readable storage medium;
   select, based at least in part on the data operation, a first zone of the plurality of zones,
   record, to the first zone, a sync record indicating at least a partial order of performing the data operation relative to performance of a previous data operation, the partial order including identification of a second zone of the plurality of zones; and
   perform the data operation with the volume on a subset of the plurality of zones, the subset including at least the second zone.

15. The non-transitory computer-readable storage medium of claim 14, wherein the instructions further comprise instructions that, when executed by the one or more processors, cause the computer system to:
   determine a sequence number;
   reset a first found bit in a first index page of an index and reset a second found bit in a second index page of an index;
   update the first index page with the sequence number and update the second index page with the sequence number;
   select a zone from the plurality of zones;
   read a first record from the zone;
   determine that the first record is recorded in the first index page and set the first found bit of the first index page;
   read a second record from the zone; and
   determine that the second record is not recorded in the second index page and avoid setting the second found bit of the second index page.

16. The non-transitory computer-readable storage medium of claim 15, wherein the second record is a shard of redundancy-encoded data and contents of the second record are recoverable from redundancy encoding contained in other shards of the redundancy-encoded data.

17. The non-transitory computer-readable storage medium of claim 15, wherein a space index is updated to indicate that the zone of the plurality of zones has additional free space in an amount corresponding to a size of the second record.

18. The non-transitory computer-readable storage medium of claim 14, wherein the instructions further comprise instructions that, when executed by the one or more processors, cause the computer system to:
   determine that a zone of the plurality of zones is suitable for cleaning;
   copying a set of data objects on the zone to one or more different zones; and
   erasing the zone of the plurality of zones.

19. The non-transitory computer-readable storage medium of claim 18, wherein the zone of the plurality of zones is determined to be suitable for cleaning as a result of containing less non-obsolete data than other zones of the plurality of zones.

20. The non-transitory computer-readable storage medium of claim 18, wherein the instructions further comprise instructions that, when executed by the one or more processors, cause the computer system to ensure that at least two zones of the plurality of zones are reserved for migrating the set of data objects during the cleaning.

* * * * *